United States Patent
Senarath

(10) Patent No.: US 10,841,184 B2
(45) Date of Patent: Nov. 17, 2020

(54) ARCHITECTURE FOR INTEGRATING SERVICE, NETWORK AND DOMAIN MANAGEMENT SUBSYSTEMS

(71) Applicant: Nimal Gamini Senarath, Ottawa (CA)

(72) Inventor: Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 15/934,187

(22) Filed: Mar. 23, 2018

(65) Prior Publication Data
US 2018/0287894 A1    Oct. 4, 2018

Related U.S. Application Data

(60) Provisional application No. 62/477,968, filed on Mar. 28, 2017.

(51) Int. Cl.
| G06F 15/173 | (2006.01) |
| H04L 12/24 | (2006.01) |
| H04L 29/08 | (2006.01) |

(52) U.S. Cl.
CPC ...... H04L 41/5054 (2013.01); H04L 41/0806 (2013.01); H04L 41/5019 (2013.01); H04L 67/1012 (2013.01); H04L 41/5009 (2013.01)

(58) Field of Classification Search
CPC ............ H04L 41/5009; H04L 41/5054; H04L 41/5019; H04L 41/0806; H04L 67/1012
See application file for complete search history.

(56) References Cited

U.S. PATENT DOCUMENTS

| 2014/0317261 | A1 | 10/2014 | Shatzkamer et al. |
| 2015/0257012 | A1 | 9/2015 | Zhang |
| 2016/0150421 | A1 | 5/2016 | Li et al. |
| 2016/0353465 | A1* | 12/2016 | Vrzic ................... H04W 12/06 |
| 2017/0303259 | A1* | 10/2017 | Lee ....................... H04W 28/16 |
| 2019/0104455 | A1* | 4/2019 | Park ....................... H04W 76/19 |
| 2019/0174498 | A1* | 6/2019 | Samdanis ............. H04W 16/10 |
| 2019/0246332 | A1* | 8/2019 | Berggren ................ H04W 8/24 |
| 2019/0261233 | A1* | 8/2019 | Duan ................ H04W 36/0066 |

FOREIGN PATENT DOCUMENTS

| CN | 104009871 A | 8/2014 |
| CN | 106412040 A | 2/2017 |
| WO | 2016086214 A1 | 6/2016 |
| WO | 2016192643 A1 | 12/2016 |

* cited by examiner

*Primary Examiner* — Richard G Keehn

(57) ABSTRACT

A method of controlling a service instance in a virtual network, the method comprising providing a Service Management Function entity in a control plane of the virtual network, the Service Management Function being configured to process requirements of a Service Level Agreement and generate corresponding control plane requests for physical resources to satisfy the Service Level Agreement.

21 Claims, 18 Drawing Sheets

| Scenario | Slice Instantiation | Initial NF (Slice Configuration) | Slice (re)configuration | Slice Usage (re)configuration | Slice Lifecycle Management |
|---|---|---|---|---|---|
| A | NM | NM | NM | NM | NM |
| B | NM | NM | NM | NM | SOM |
| C | NM | NM | NM | SOM | SOM |
| D | NM | NM | SOM | SOM | SOM |
| E | NM | SOM | SOM | SOM | SOM |
| F | SOM | SOM | SOM | SOM | SOM |

FIG. 12

ARCHITECTURE FOR INTEGRATING SERVICE, NETWORK AND DOMAIN MANAGEMENT SUBSYSTEMS

CROSS-REFERENCE TO RELATED APPLICATIONS

This application is based on, and claims benefit of, U.S. provisional patent application No. 62/477,968 filed Mar. 28, 2017, the entire content of which is hereby incorporated herein by reference.

FIELD OF THE INVENTION

The present invention pertains to the field of network management systems, and in particular to an architecture for integrating service, network and domain management subsystems.

BACKGROUND

Network functions virtualization (NFV) is a network architecture concept that uses the technologies of IT virtualization to create entire classes of virtualized network functions into building blocks that may connect, or be chained together, to create communication services. NFV relies upon, but differs from, traditional server-virtualization techniques, such as those used in enterprise IT. A virtualized network function (VNF) may consist of one or more virtual machines (VMs) running different software and processes, on top of standard high-volume servers, switches and storage devices, or even cloud computing infrastructure, instead of having custom hardware appliances for each network function. In other embodiments, a VNF may be provided without use of a Virtual Machine through the use of other virtualization techniques including the use of containers. In further embodiments, a customized hardware appliance may be resident within the physical infrastructure used for different virtual networks, and may be presented to each virtual network as a virtual version of itself based on a partitioning of the resources of the appliance between networks. For example, a virtual session border controller could be instantiated upon existing resources to protect a network domain without the typical cost and complexity of obtaining and installing physical network protection units. Other examples of VNFs include virtualized load balancers, firewalls, intrusion detection devices and WAN accelerators.

The NFV framework consists of three main components:
Virtualized network functions (VNFs) are software implementations of network functions that can be deployed on a network functions virtualization infrastructure (NFVI).
Network functions virtualization infrastructure (NFVI) is the totality of all hardware and software components that provide the resources upon which VNFs are deployed. The NFV infrastructure can span several locations. The network providing connectivity between these locations is considered as part of the NFV infrastructure.
Network functions virtualization MANagement and Orchestration (MANO) architectural framework (NFV-MANO Architectural Framework, for example the NFV-MANO defined by the European Telecommunications Standards Institute (ETSI), referred to as ETSI_MANO or ETSI NFV-MANO) is the collection of all functional blocks, data repositories used by these blocks, and reference points and interfaces through which these functional blocks exchange information for the purpose of managing and orchestrating NFVI and VNFs.

The building block for both the NFVI and the NFV-MANO are the resources of an NFV platform. These resources may consist of virtual and physical processing and storage resources, virtualization software and may also include connectivity resources such as communication links between the data centers or nodes providing the physical processing and storage resources. In its NFV-MANO role the NFV platform consists of VNF and NFVI managers and virtualization software operating on a hardware platform. The NFV platform can be used to implement carrier-grade features used to manage and monitor the platform components, recover from failures and provide appropriate security—all required for the public carrier network.

Software-Defined Topology (SDT) is a networking technique that defines a logical network topology in a virtual network. Based on requirements of the service provided on the virtual network, and the underlying resources available, virtual functions and the logical links connecting the functions can be defined by an SDT controller, and this topology can then by instantiated for a given network service instance. For example, for a cloud based database service, an SDT may comprise logical links between a client and one or more instances of a database service. As the name implies, an SDT will typically be generated by an SDT controller which may itself be a virtualized entity in a different network or network slice. Logical topology determination is done by the SDT controller which generates a Network Service Infrastructure (NSI) descriptor (NSLD) as the output. It may use an existing template of an NSI and add parameter values to it to create the NSLD, or it may create a new template and define the composition of the NSI.

Software Defined Protocol (SDP) is a logical End-to End (E2E) technique that may be used within a network service instance. SDP allows for the generation of a customized protocol stack (which may be created using a set of available functional building blocks) that can be provided to different nodes or functions within the network, or network slice. The definition of a slice specific protocol may result in different nodes or functions within a network slice having defined procedures to carry out upon receipt of a type of packet. As the name implies, an SDP will typically be generated by one or more SDP controllers which may be virtualized functions instantiated upon a server.

Software-Defined Resource Allocation (SDRA) refers to the process of allocation of network resources for logical connections in the logical topology associated with a given service instance or network slice. In an environment in which the physical resources of a network are used to support a plurality of network slices, an SDRA controller will allocate the processing, storage and connectivity resources of the network to the different network slices to best accommodate the agreed upon service requirements for each of the network slices. This may result in a fixed allocation of resources, or it may result in an allocation that is dynamically changed to accommodate the different temporal distribution of traffic and processing requirements. As the name implies, an SDRA Controller will typically determine an allocation of resources, and may be implemented as a function that is instantiated upon a server.

Service Oriented Network Auto Creation (SONAC) is a technology that makes use of software-defined topology (SDT), software defined protocol (SDP), and software-defined resource allocation (SDRA) techniques to create a network or virtual network for a given network service instance. By coordinating the SDT, SDP, SDRA and in some embodiments Software Defined Network (SDN) control, optimization and further efficiencies can be obtained. In some cases, a SONAC controller may be used to create a network slice within which a 3rd Generation Partnership Project (3GPP) compliant network can be created using a virtualized infra-structure (e.g. VNFs and logical links) to provide a Virtual Network (VN) service. Those skilled in the art will appreciate that the resources allocated to the different VNFs and logical links may be controlled by the SDRA-type functionality of a SONAC controller, while the manner in which the VNFs are connected can be determined by the SDT-type functionality of the SONAC controller. The manner in which the VNFs process data packets may be defined by the SDP-type functionality of the SONAC controller. A SONAC controller may be used to optimize the Network Management, and so may also be considered to be a Network Management (NM) optimizer.

As the implementation details and standards of NFV evolve, architecture options for ensuring that service level agreements (SLAs) can be satisfied in a consistent and reliable manner are highly desirable.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide architecture options for ensuring that service level agreements (SLAs) can be satisfied.

Accordingly, an aspect of the present invention provides a method of controlling a service instance in a virtual network, the method comprising providing a Service Management Function entity in a control plane of the virtual network, the Service Management Function being configured to process requirements of a Service Level Agreement and generate corresponding control plane requests for physical resources to satisfy the Service Level Agreement.

An aspect of the present invention provides a method at a service management function in an operator network. The method comprises: receiving a network slice service request; receiving local resource information from resource management units of the operator network; receiving remote resource information from at least one subnetwork managed by a different operator; determining a division of resources between the operator network and the at least one subnetwork in accordance with the received network slice service request, the received local resource information and the received remote resource information; and transmitting a request for an allocation of instantiated resources in the operator network and the at least one subnetwork in accordance with the determined division of resources. It can be understood that the resource information may be named as local resource information to indicate that it is from a function in the operator network or as remote resource information to indicate that it is from a function in a network managed by a different operator.

In some embodiments, the step of receiving remote resource information from the at least one subnetwork managed by a different operator comprises requesting the remote resource information from one or more management units of the other operator.

In some embodiments, the operator network and the subnetwork are 3GPP compliant networks.

In some embodiments, at least one of the operator network and the subnetwork are non-3GPP compliant networks.

In some embodiments, the step of transmitting includes transmitting a resource allocation request to a network manager within the operator network.

In some embodiments, the step of transmitting includes transmitting a resource allocation request to an entity within the subnetwork.

In some embodiments, the entity within the subnetwork is one of a SvMF, a Network Manager (NM) and a Slice Operations Manager (SOM).

In some embodiments, at least one of the SvMF, the NM and the SOM is a non-3GPP compliant entity.

In some embodiments the step of determining the division of resources includes determining a division of resources between 3GPP compliant resources and non-3GPP compliant resources.

In some embodiments, the step of transmitting includes transmitting a resource allocation request for 3GPP compliant resources and services to a 3GPP compliant entity.

In some embodiments, the step of transmitting includes transmitting a resource allocation request for non-3GPP compliant resources and services to a non-3GPP compliant entity.

In some embodiments, the step of transmitting includes transmitting a resource allocation request for 3GPP compliant resources and services to a non-3GPP compliant entity.

In some embodiments, the transmitted request includes one of a network service instance (NSI) and a network subnet slice instance (NSSI) to indicate the determined resources.

Some embodiments further comprise, upon receipt of a response to the transmitted request, incorporating into an existing NSI the received NSI as a sub-NSI.

A further aspect of the present invention provides a service management function of a network. The service management function comprises: at least one processor; a non-transitory computer readable storage medium including software instructions configured to control the at least one processor to implement steps of: receiving resource information from one or more management functions of the network; receiving a request to obtain a network slice service; determining an availability of network resources to satisfy the requested network slice service based on the resource information received from the management functions; and transmitting control plane requests for at least a portion of the determined available network resources to satisfy a service level agreement associated with the requested slice service.

In some embodiments, the one or more management functions belong to either the network or a domain external to the network.

In some embodiments, the one or more management functions comprises one or more of:
a Global Network Manager (GNM) of the network;
a Domain Manager (DM) associated with a network domain;
an Element Manager (EM) associated with one or more network elements;
a service management function of another network; and
a 3GPP-compliant network management unit.

In some embodiments, the 3GPP-compliant network management unit comprises any one or more of:
a Management and Orchestration (MANO) function;

a Domain Manager (DM);
an Element Manager (EM); and
a Slice Operations Manager (SOM)

BRIEF DESCRIPTION OF THE FIGURES

Further features and advantages of the present invention will become apparent from the following detailed description, taken in combination with the appended drawings, in which:

FIG. 12 is a chart illustrating example scenarios for managing a slice;

It will be noted that throughout the appended drawings, like features are identified by like reference numerals.

DETAILED DESCRIPTION

Figure 1:
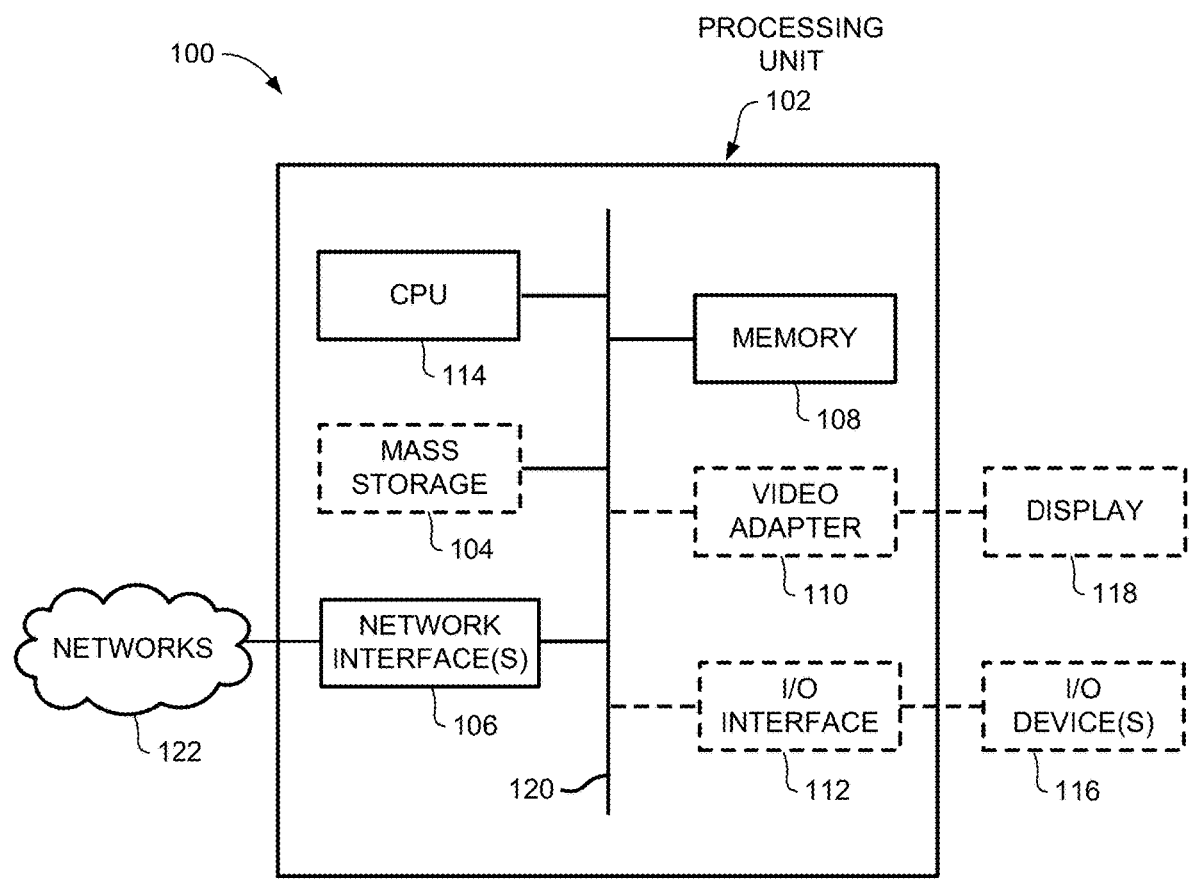
FIG. 1 is a block diagram of a computing system 100 that may be used for implementing devices and methods in accordance with representative embodiments of the present invention.

FIG. 1 is a block diagram of a computing system 100 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. The processing unit 102 typically includes a central processing unit (CPU) 114, a bus 120 and a memory 108, and may optionally also include a mass storage device 104, a video adapter 110, and an I/O interface 112 (shown in dashed lines).

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. In an embodiment, the memory 108 may include ROM for use at boot-up, and DRAM for program and data storage for use while executing programs. The bus 120 may be one or more of any type of several bus architectures including a memory bus or memory controller, a peripheral bus, or a video bus.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, or an optical disk drive.

The video adapter 110 and the I/O interface 112 provide optional interfaces to couple external input and output devices to the processing unit 102. Examples of input and output devices include a display 118 coupled to the video adapter 110 and an I/O device 116 such as a touch-screen coupled to the I/O interface 112. Other devices may be coupled to the processing unit 102, and additional or fewer interfaces may be utilized. For example, a serial interface such as Universal Serial Bus (USB) (not shown) may be used to provide an interface for an external device.

The processing unit 102 may also include one or more network interfaces 106, which may comprise wired links, such as an Ethernet cable, and/or wireless links to access one or more networks 122. The network interfaces 106 allow the processing unit 102 to communicate with remote entities via the networks 122. For example, the network interfaces 106 may provide wireless communication via one or more transmitters/transmit antennas and one or more receivers/receive antennas. In an embodiment, the processing unit 102 is coupled to a local-area network or a wide-area network for data processing and communications with remote devices, such as other processing units, the Internet, or remote storage facilities.

Figure 2:
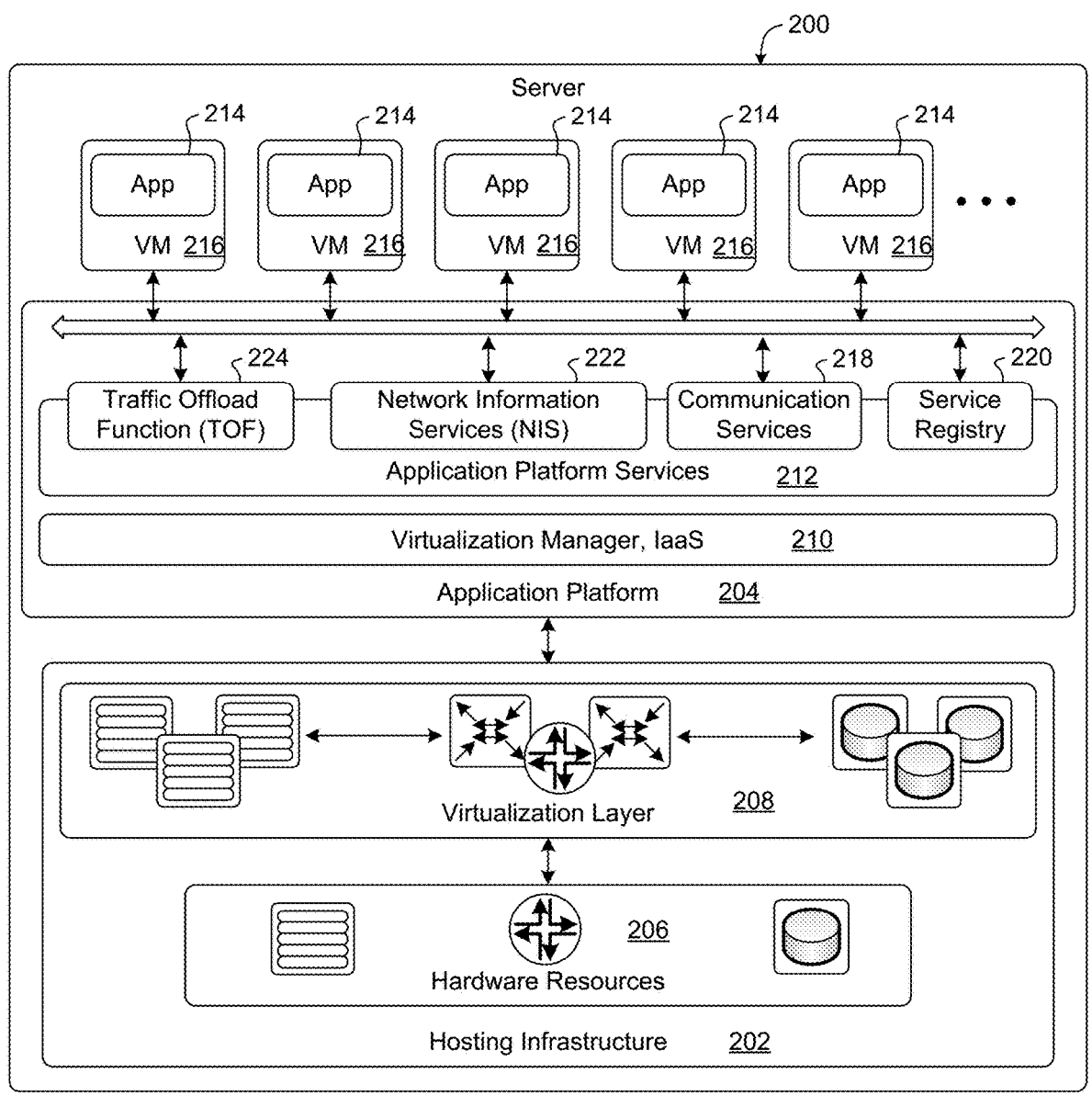
FIG. 2 is a block diagram schematically illustrating an architecture of a representative server usable in embodiments of the present invention.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216, or as a virtualized container, that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANO and SONAC (and its various functions such as SDT, SDP, and SDRA) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A Service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (uplink and/or downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3:
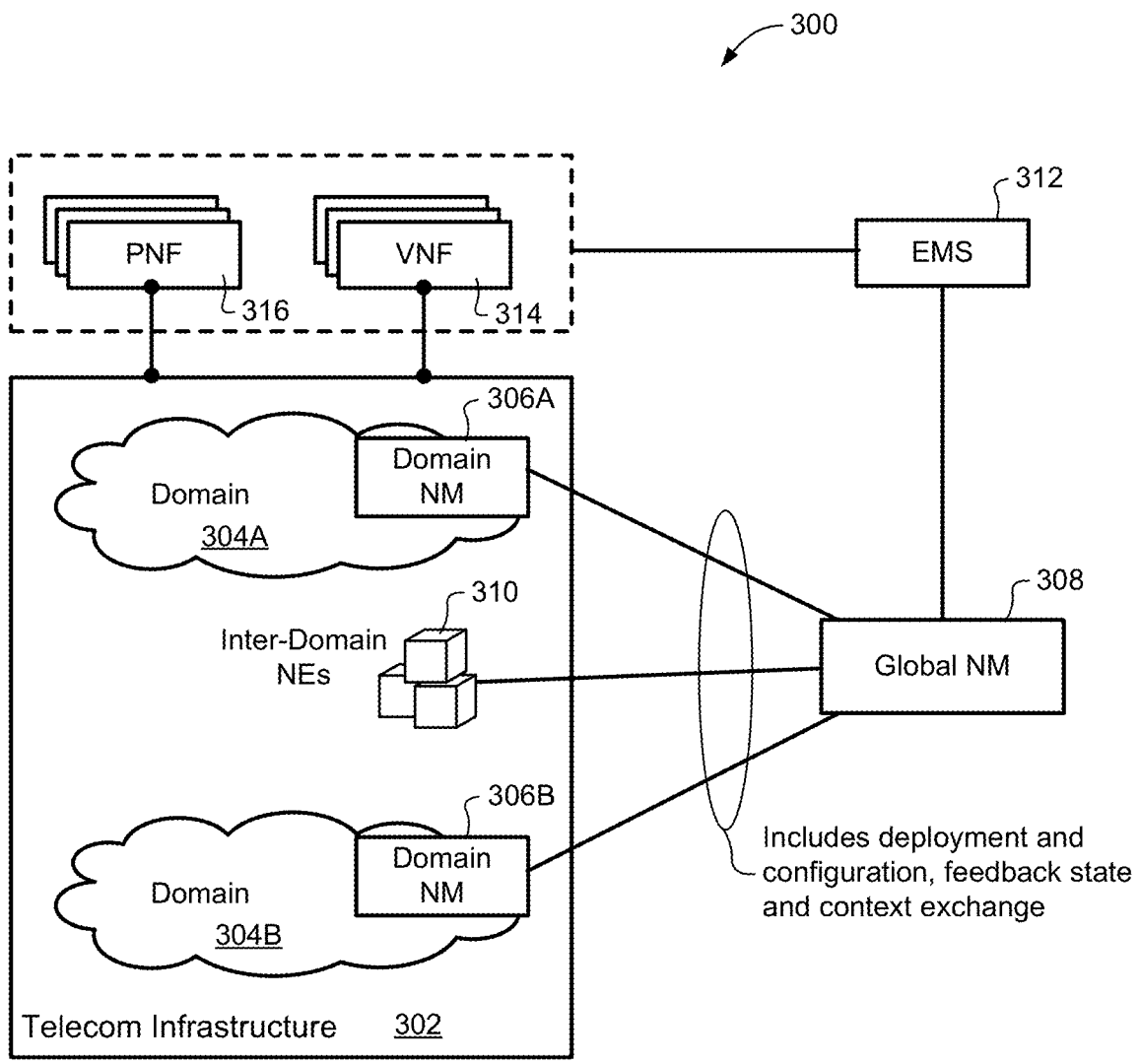
FIG. 3 is a block diagram schematically illustrating hierarchical network management in accordance with representative embodiments of the present invention.

FIG. 3 is a block diagram schematically illustrating hierarchical network management in accordance with representative embodiments of the present invention. In the example of FIG. 3, the communications network 300 is composed of Telecom-Infrastructure 302, which may be separated into a plurality of domains 304, which may, for example, correspond with a core network, a Radio Access Network (RAN), or a subdomain operating under a defined management scheme. Each domain 304 is managed by a respective Domain Network Manager (DNM) 306. In some embodiments, each network domain 304 may have a unique DNM 306. However, the entire network 300 is managed by a central Global NM (GNM) 308, with the assistance of the Domain NMs 306. The Global NM 308 may also directly manage inter-domain Network Elements (NEs) 310, that are not directly managed by any Domain NMs 306. With this arrangement, the Global NM 308 can be considered to constitute a Parent Domain, while each separately managed domain 304 of the network 300 can be considered to constitute a respective Child Domain. It should be understood that in some embodiments a child domain may not have a DNM 306, and instead may be directly managed by the GNM 308.

FIG. 3 also illustrates an Element Management System 312, which may interact with the GNM 308 to manage Virtual Network Functions (VNFs) 314 and Physical Network Functions (PNFs) 316 of the Telecom Infrastructure 302. A Physical Network Function (PNF) is an implementation of a NF via a tightly coupled software and hardware system.

The Element Management Systems (EMS) 312 consists of systems and applications for managing network elements (NE) which may be both physical and virtual resources. In other embodiments the NEs may be exclusively either physical resource or virtual resources. The element management system's key functionality may be divided into five key areas—fault, configuration, accounting, performance and security (FCAPS). The EMS 312 may interface with network management systems and or service management systems depending on the deployment scenario, and with individual network elements. An element management system 312 may manage one or more of a specific type of telecommunications network element. The EMS 312 may manage the functions and capabilities within each NE but may not manage the traffic between different NEs in the network. To support management of the traffic between itself and other NEs, the EMS 312 may communicate upward to higher-level network management systems (NMS) as described in the telecommunications management network layered model.

Figure 4:
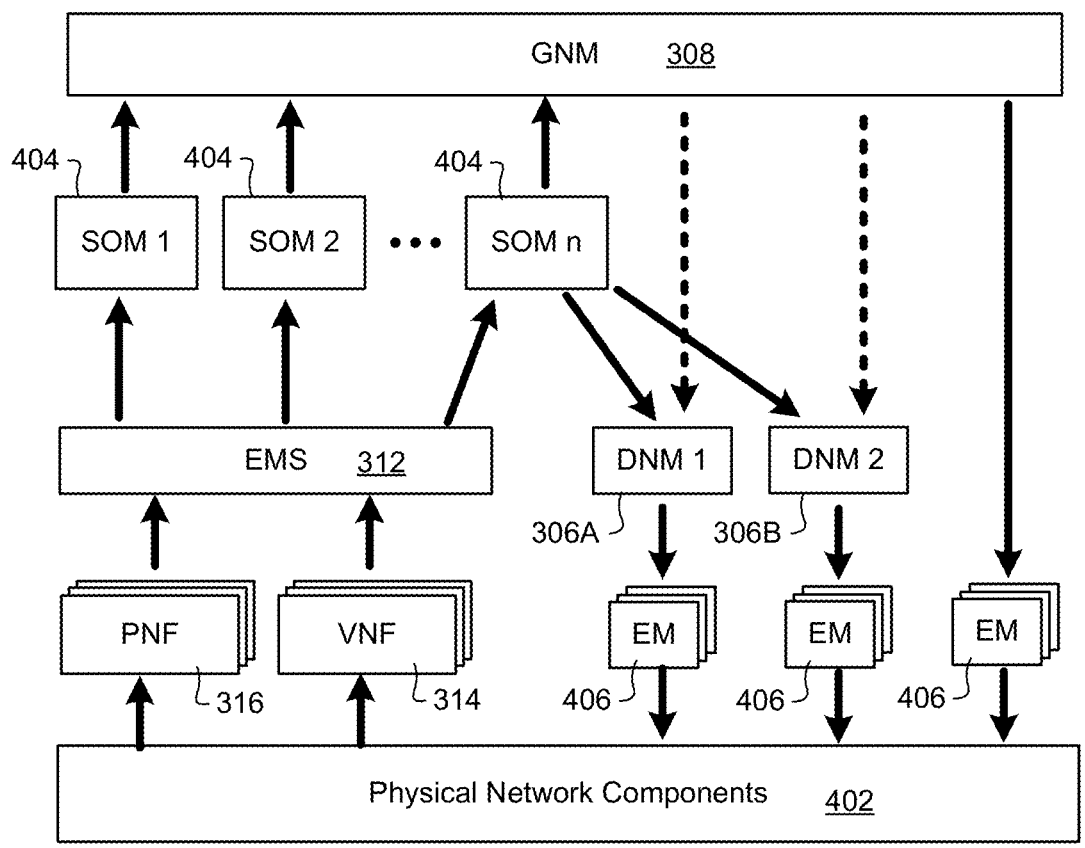
FIG. 4 is a block diagram schematically illustrating functional elements of the hierarchical network management architecture illustrated in FIG. 3

FIG. 4 is a block diagram schematically illustrating functional elements of the hierarchical network management architecture illustrated in FIG. 3. In the illustration of FIG. 4, upward directed arrows represent exposure of various lower-level parameters (such as, for example, capabilities, resource availability, current usage, reserved resources, maximum potential resources that can be used, and minimum available resources that can be guaranteed), while downward directed arrows represent control operations. In this sense, the resources may be CPU and/or memory capacity, buffer capacity, a caching capacity or a connectivity resource associated with a link that may include a specification of at least one of the link capacity, a bound on jitter, and a latency associated with the link. If desired, the specific behaviours, functions or data exposed by each layer of the hierarchy to higher layers may be agreed upon in advance, for example by means of Virtual Network Access Control (VNAC). As may be seen in FIG. 4, the Physical Network Components 402 (forming the Telecom network infrastructure 302, for example) may be exposed as the Physical Network Functions (PNFs) 316 and Virtual Network Functions (VNFs) 314 to the Element Management Systems (EMS) 312. In a sliced network that supports differential traffic handling across slices (and possibly within a single slice), the EMS 312 may expose slice-specific element management information to respective Slice Operation Managers (SOMs) 404. These SOMs 404 may also expose slice related network management information to the Global NM 308. In an example embodiment, the SOMs 404 may interact with the Global NM 308 using Network Scenario Description Language (NSDL).

One or more SOMs 404 may interact directly with domain network mangers (DNMs) 306 to implement slice-specific management functions in each domain 304. Alternatively (or in addition), the Global NM 308 may interact directly with domain network mangers (DNMs) 306 to implement slice-non-specific management functions in each domain 304. Each DNM 306 may interact with Physical network components 402 either directly or via one or more Element Managers (EMs) 406 to implement the management functions requested by the SOMs 404 and/or the GNM 308. In addition, the GNM 308 may also interact with Physical network components either directly or via one or more Element Managers (EMs) 406 to implement desired management functions.

If desired, a third-party Virtual Network Software Program may interact with the EMS 312 and/or a SOM 404 to implement desired virtual network functionality.

A service-level agreement (SLA) is a commitment between a service provider and the customer. The SLA defines levels of service to be provided under different circumstances, and may also specify penalties for failing to meet the agreed upon levels of service. An SLA may specify different levels of service (defined in any of a number of ways including the number of transactions handled per block of time, an outage metric, or another such QoS definition) along with different charging levels for each specified level of service. Particular aspects of the service such as a Quality of Service (QoS) metric, availability (e.g. uptime or lack of outage), and responsibilities are agreed upon between the service provider and the customer. As an example, Internet service providers and network operators will commonly include service level agreements within the terms of their contracts with customers to define the level(s) of service being sold. In this case the SLA will typically have a technical definition in terms of mean time between failures (MTBF), mean time to repair or mean time to recovery (MTTR); identifying which party is responsible for reporting faults or paying fees; responsibility for ensuring the delivery of a service with specified data rates; throughput; jitter; or similar measurable performance details. In order to implement a service satisfying a Service Level Agreement (SLA) in the network, the GNM and DNMs must allocate appropriate physical network element resources to the involved service.

In order to provide network resources to satisfy a SLA, a SerVice Management Function (SvMF) may gather information about the network resources through the capabilities exposure interfaces that lower layer entities may provide. It should be understood that reference to lower layer entities may include functions and nodes within the management or control plane of the network that are logically arranged below the SvMF (such as the NM or SOM within the operator domain) or other entities within a domain manager below the operator domain). This can be accomplished either by enabling the SvMF to aggregate capabilities of controlled nodes (e.g. nodes controlled by an NM, DNM, or an EM, for example) and to monitor a current status of usage or expected status of usages. The expected status of usage may be monitored by examining currently accepted services and SLAs in order to estimate an extent to which certain resources may be over provisioned or over-sold.

The SvMF may also determine how many and which resources to request from the GNM 308, SOM 404 or DNM 306. Furthermore, the SvMF may interact with other SvMFs to request resources from those entities controlling other network resources. This may be a horizontal interface between infrastructure providers and operators. In such cases, the SvMF may interact with other SvMFs by requesting to implement a chosen fraction of the original SLA. Such a fraction could be decided in order to provide coverage where the Operator's own infrastructure is lacking, or where it does not have sufficient resources to fully satisfy the requested SLA. Preferably (whether via an horizontal interface SvMF-SvMF or vertical SvMF-NM) the SvMF will try to minimize the cost of resources allocated to any specific service instance: either resources under its own control or resources form other infrastructure providers. In some cases it may determine that using expensive resources of another infrastructure provider is beneficial in order to keep its own resources to satisfy more revenue generating SLAs.

When determining which resources to use, the SvMF may evaluate the cost of resources provided by another SvMF for satisfying part or all of the SLA and compare that to the cost of using its own resources. This operation implies evaluating the cost of activating NFVs in Data Centers or Edge Computing Centers as well as the related cost of activating hardware and increased electricity usage. It must also account for the extra cost of using transport resources when deciding to activate functions in remote versus local resources. Factoring all these cost together may yield different possible network instances. The SvMF may further refine or select one configuration of resources according to other factors, such as future refactoring capabilities to keep the network dynamic.

When determining how to provide for a new SLA, the SvMF may have to refactor resources currently used for other SLAs. This refactoring process may be done pre-emptively and dynamically as SLAs are activated and resources start to be used. This may allow the SvMF to re-evaluate the extent to which some resources may be over-sold while still maintaining a desired availability threshold in terms of total capacity, blocking/dropping etc. For example, one SLA may be satisfied by reserving resources from either one of two network entities. Subsequently, a new SLA may need a specific one of these two network entities. The SvMF will therefore have to reconfigure the network to make space for the new SLA.

As the implementation details and standards of NFV evolve, manual configuration of the network to satisfy existing SLAs can become time consuming and raises the risk of error. The present invention addresses this problem by providing Service Management Function (SvMF) that can be instantiated within the conventional network management architecture. In specific embodiments, the Service Management Function (SvMF) is configured to interface with network management entities within the network to implement one or more SLAs. For example, an SvMF entity may operate to process performance requirements defined in an SLA (such as QoS, traffic prioritization, and data rate, for example) to generate appropriate service management messages that can be passed to a network management function (such as the Global Network Manager or one or more Domain Network Managers) using an Application Program Interface (API) of the involved network manager. Upon receipt of the request message(s), the network management function may operate to allocate physical network recourses as needed to satisfy the request(s).

An advantage of this arrangement is that changes in the behavior or functionality of a given network management entity can be accommodated by updating the SvMF (e.g. by adding API function calls) to exploit the new behavior or functionality. It is therefore no longer necessary for network operators to manually intervene in the network management system to ensure that existing SLAs will continue to be satisfied under the new (updated) network management entity.

Figure 5:
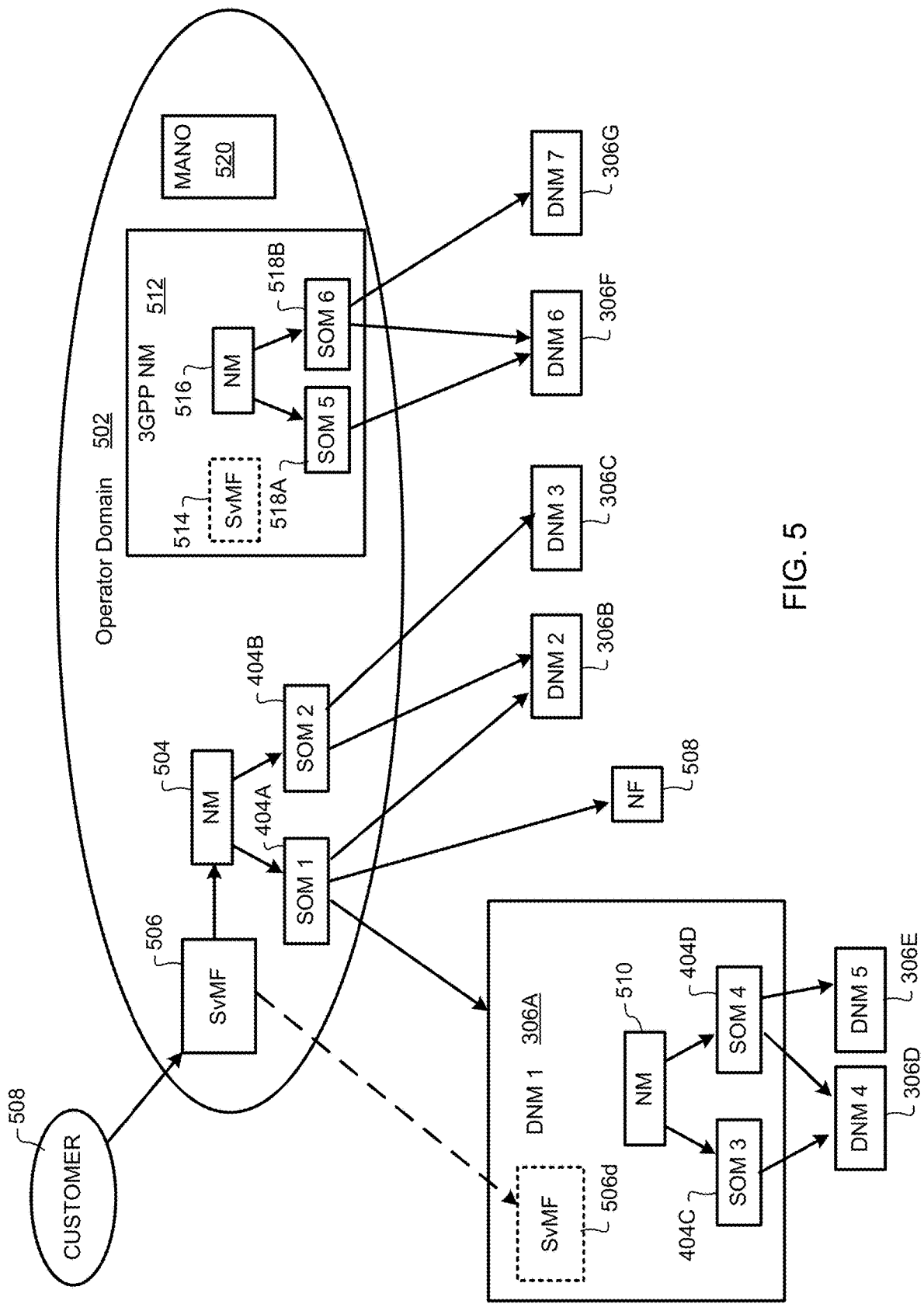
FIG. 5 is a block diagram illustrating representative management scenarios in which an SvMF may be used.

FIG. 5 is a block diagram illustrating representative management scenarios in which an SvMF may be implemented in a network operator domain. In particular, three scenarios are illustrated:

Scenario 1: SvMF interface with global network manager. In this scenario, the network operator domain 502 includes a top-level network management entity 504 (which may correspond with the global network manager 308 of FIGS. 3 and 4), and a SvMF 506 is instantiated to operate as an interface between this top-level network management entity and customer requests. The customer 508 may interact directly with the SvMF 506 to request implementation of a given SLA. Alternatively, the customer 508 may interact with the network operator to negotiate an SLA, which is then passed (by the network operator) to the SvMF 506 for implementation. As may be seen in FIG. 5, the SvMF 506 interacts with the (global) network manager 504, which then interacts with domain network managers DNM1-DNM3 306A-C and a network function (NF) 508, via Slice Operation Managers SOM1 404A and SOM2 404B to implement SLA requests from the SvMF 506.

Scenario 2: SvMF interface with domain network manager. As may be seen in FIG. 5, domain DNM1 306A includes a network manager 510 that interacts with sub-domain network managers DNM4 306D and DNM5 306E via Slice Operation Managers SOM3 404C and SOM4 404D. For example, the domain DNM1 306A may be another Network Operator's domain. In such a case, the Network Operator may expose the capabilities of its domain either via the DNM interface or via the SvMF interface. In a scenario in which the Network Operator chooses to expose the capabilities of its domain via the SvMF interface, the domain may not be seen as a DNM but rather as a higher level of abstraction. In embodiments of the invention, a domain-level SvMF 506d may be implemented to interact with the network manager 510 of domain DNM1 306A. This domain-level SvMF 506d may also interact with the top-level SvMF 506 in the operator domain to implement SLA requests. As may be appreciated, this hierarchical arrangement of SvMF entities can recurs as needed, so that SvMF functionality may extend through as many levels of domains and sub-domains as required.

Scenario 3: SvMF interface with 3GPP network manager 512. It is contemplated that the 3GPP standards process may develop a hierarchical network management architecture broadly analogous to that described above, but likely with its own functionality and nomenclature. However, it is also contemplated that any such future network management architecture will involve the use of network management entities that interact via an API and that can be recursively instantiated. In any such scenario, SvMF entities may also be recursively instantiated as described above, and operate to interact with the 3GPP network management functions 512 to implement customer SLA requirements.

In some embodiments, the 3GPP NM 512 may include 3GPP-complaint entities including an SvMF entity 514, a Network manager entity 516 and an SOM entity 518, all of which provides functionality similar to the SvMF 506, NM 504 and SOMs 404 described above.

Corresponding SvMF 514 entities may also be defined to interact with Network functions virtualization MANagement and Orchestration (MANO) entities 520. In some embodiments the SOM entities 518A-B many provide instantiation requests to the MANO 520. These requests allow the MANO 520, such as an ETSI NFV-MANO, to instantiate functions or define logical links within the corresponding network slice.

Figure 6:
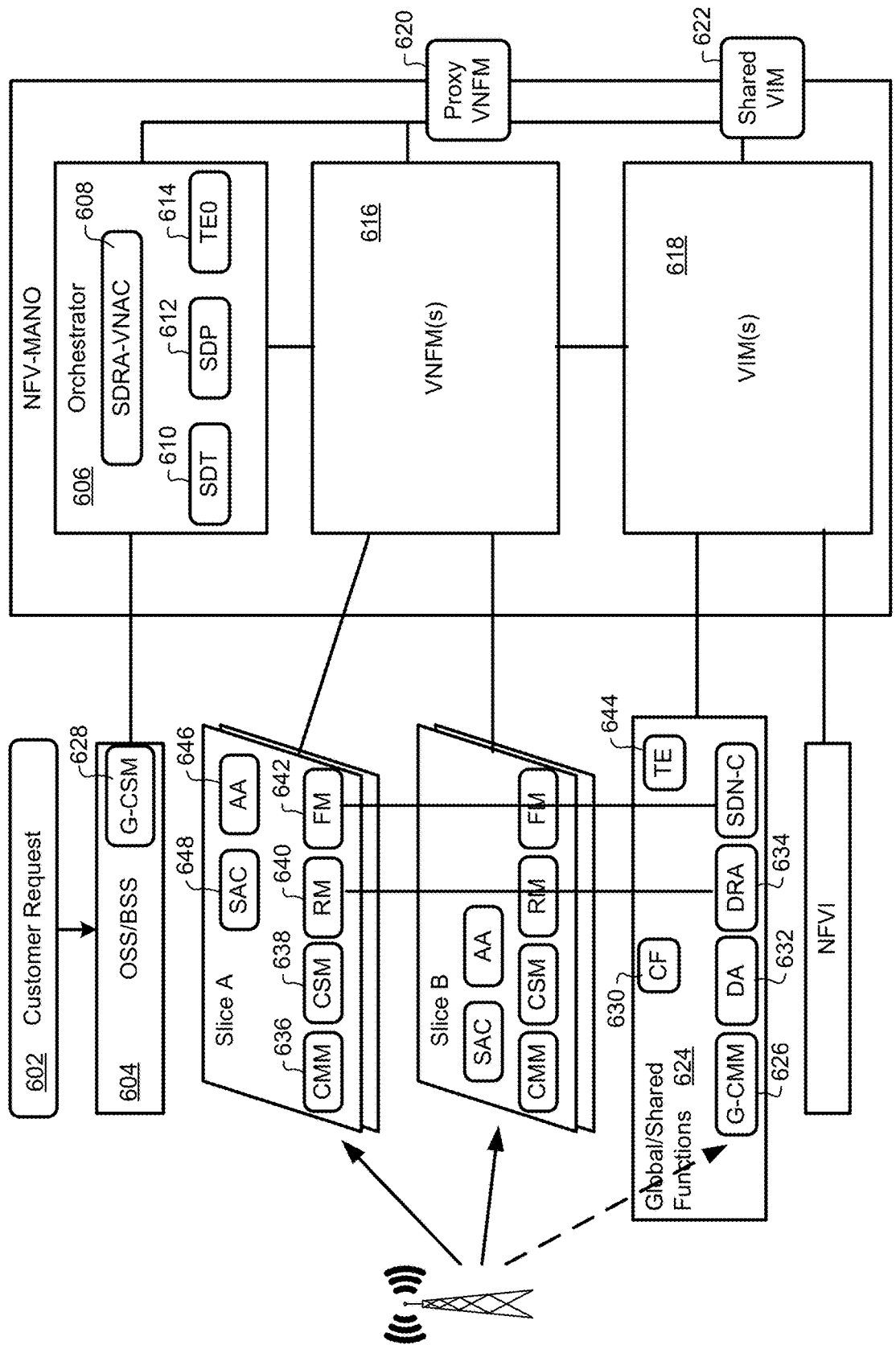
FIG. 6 is a block diagram illustrating an example of use of the ETSI/NFV framework as a tool for SONAC.

FIG. 6 is a block diagram illustrating an example of use of the ETSI/NFV framework as a tool for SONAC. In a conventional system, customer requests 602 (e.g. related to an SLA) may be passed by the network operator to an Operation Support System (OSS)/Business Support System (BSS) 604, which interacts with the NFV-MANO Orchestrator function 606 to implement each request. In embodiments of the present invention, the customer requests 602 may first be generated by a SvMF 506, based on an SLA.

In FIG. 6, Orchestrator Support/Management Functions include: Virtual Network admission control (VNAC) 608; Software Defined Topology (SDT) 610; Software defined Protocol (SDP) 612; and Traffic Engineering (TE0) 614 to support orchestration by determining the capacities of the logical topology and associated logical links based on information of the physical link. In addition, the NFV-MANO includes Virtual Network Function Management (VNFM) 616 and Virtualized Infrastructure Manager (VIM) 618 modules for management of VNFs and Network Function Virtualized Infrastructure (NFVI). In some embodiments, the NFV-MANO may also include one or more Proxy VNFM modules 620 to facilitate management of VNFs in different administrative domains. In some embodiments, the NFV-MANO may also include one or more shared VIM modules 622, which may be provided by a $3^{rd}$ party to manage $3^{rd}$ party infra-structure.

Global control plane functions 624 include: Global Connection and Mobility Management (G-CMM) 626; Global Customer Service Management (G-CSM) 628; Content Forwarding (CF) 630; Data Analytics (DA) 632; and Dynamic Resource Assignment (DRA) 634 across slices.

The slice specific control plane functions include: Connection and Mobility Management (CMM) 636; Customer Service Management (CSM) 638; Resource Monitoring (RM) 640; Flow Management (FM) 642; Per Slice Traffic Engineering (TE) 644; Authentication and Authorization (AA) 646; and Session Admission Control (SAC) 648.

Figure 7:
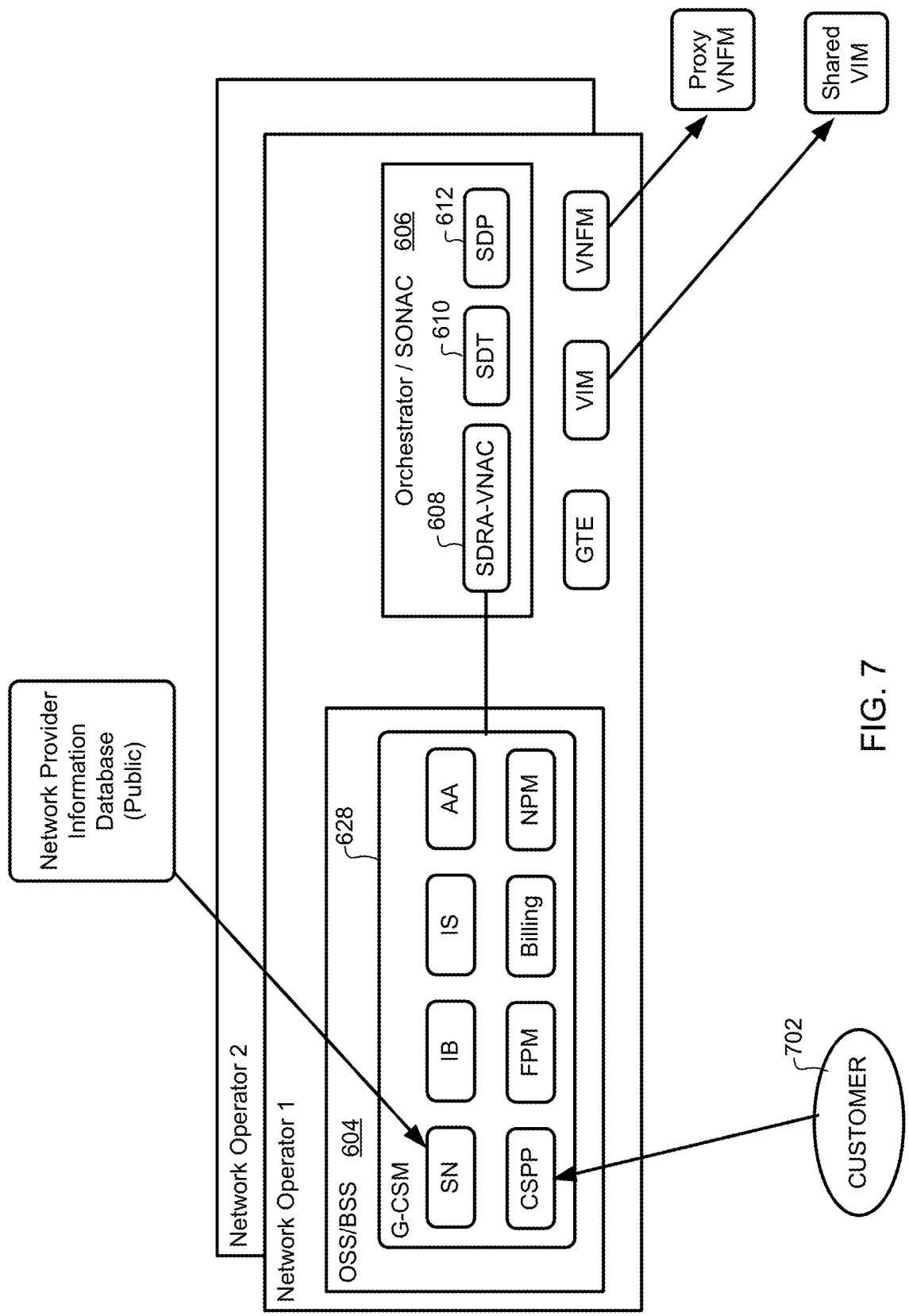
FIG. 7 is a block diagram illustrating Customer Service Management in the example of FIG. 6.

FIG. 7 is a block diagram illustrating Customer Service Management in the example of FIG. 6. In the example of FIG. 7, the customer 702 may be a vertical service operator. The G-CSM 628 performs various functions for managing a service instance, including, for example: Traffic monitoring for charging, TE, QoE Monitoring, Content Forwarding, Data Analytics, Slice Resource Assignment, Authenticator, Subscription Data Base, Mobility Management, Session Management, Policy Function, and User plane GW (UP) Slice selection function (SSF). Of these, the network will control functions related to Common (Shared/Global) Control, Slice specific control plane functions, and Slice Specific user plane functions. Under some circumstances (e.g. at the network operator's discretion), the customer may be permitted to control one or more Slice specific control functions and Slice Specific user plane functions. In such cases, customer control may be mediated by the SvMF, which uses the API of the G-CSM module and can therefore police the control actions taken by the customer.

Figure 8:
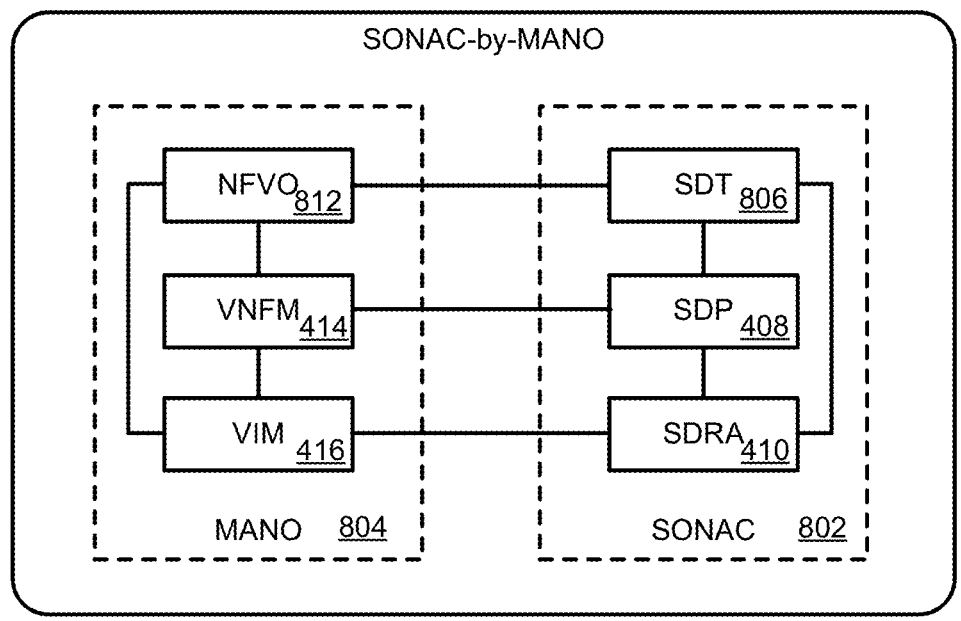
FIG. 8 is a block diagram schematically illustrating an example interworking option between SONAC and MANO.

FIG. 8 is a block diagram schematically illustrating an example interworking option between SONAC 802 and MANO 804 in accordance with representative embodiments of the present invention. In the interworking option of FIG. 8, the MANO function 804 is enhanced by configuring its Network Function Virtualization Orchestrator (NFVO) 812 to receive topology information from the Software Defined Topology (SDT) function 806 of the SONAC 802 as a network service request. In some embodiments this network service request may be formatted as defined by the European Telecommunications Standards Institute (ETSI). Similarly, the VNFM 814 of the MANO 804 may be configured to receive protocol information from the SDP controller 808 of the SONAC 802, while the VIM 816 of the MANO 804 may be configured to receive resource allocation data from the SDRA 810 of the SONAC 802.

In some embodiments, the SONAC and MANO may be co-resident in a common network manager (e.g. either one or both of the GNM 308 or a DNM 306). In other embodiments the SONAC may be resident in the GNM 308, while the MANO is resident in a DNM 306, or vice versa. In the illustrated example, the SONAC 802 is represented by a Software Defined Topology (SDT) controller 806, a Software Defined Protocol (SDP) controller 808 and a Software Defined Resource Allocation (SDRA) controller 810, while the MANO 804 is represented by a Network Function Virtualization Orchestrator (NFVO) 812, a Virtual Network Function Manager (VNFM) 814 and a Virtualized Infrastructure Manager 816). The SDT controller 806, SDP controller 808 and SDRA controller 810 of the SONAC 802 interact with each other to implement optimization of the network or network domain controlled by the SONAC 802. Similarly, the NFVO 812, VNFM 814 and VIM 816 of the MANO 804 interact with each other to implement network function management within the network or network domain controlled by the MANO 804. In some embodiments, each of the NFVO 812, VNFM 814 and VIM 816 of the MANO 8404 may be configured to interact directly with the SDT controller 806, SDP controller 808 and SDRA controller 810 of the SONAC 802.

Figure 9:
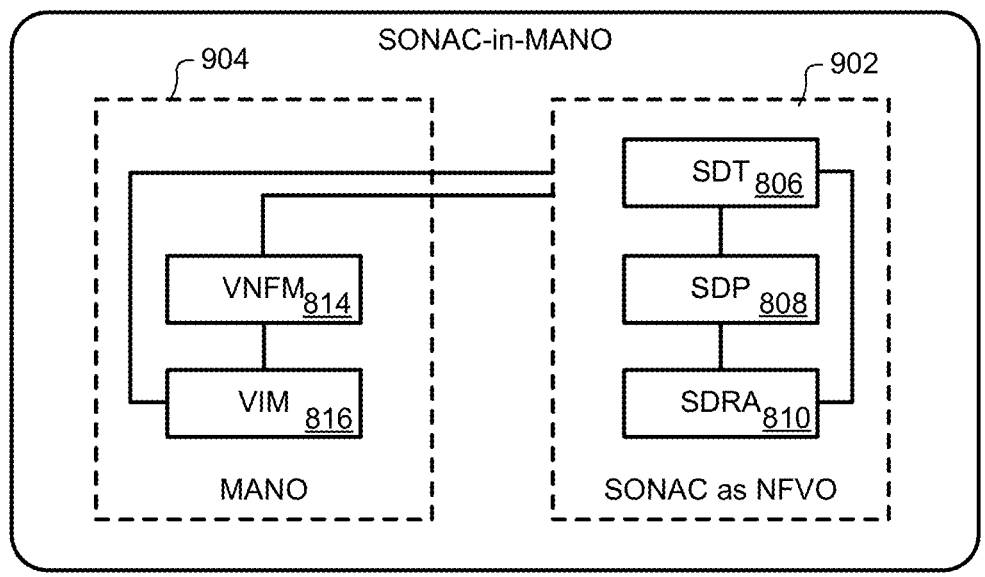
FIG. 9 is a block diagram schematically illustrating a second example interworking option between SONAC and MANO.

FIG. 9 is a block diagram schematically illustrating a second example interworking option between SONAC 902 and MANO 904 in accordance with representative embodiments of the present invention. In the interworking option of FIG. 9, the SONAC 902 is configured to provide the functionality of the MANO's Network Function Virtualization Orchestrator (NFVO) 812, in order to obtain the Orchestration functions normally provided by the NFVO 812.

In some embodiments, the SONAC 502 and MANO 504 may be co-resident in a common network manager (e.g. either one or both of the GNM 308 or a DNM 306). In other embodiments the SONAC may be resident in the GNM 308, while the MANO is resident in a DNM 306, or vice versa.

Figure 10:
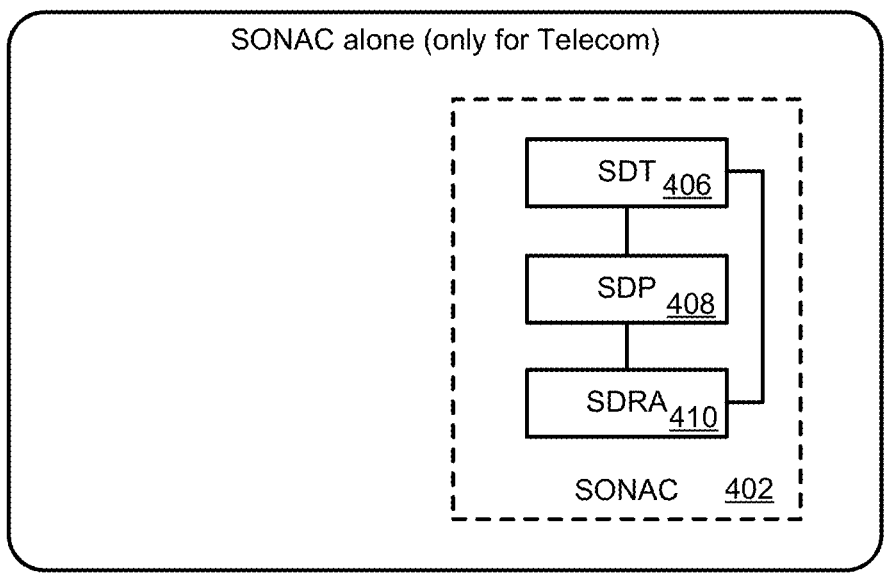
FIG. 10 is a block diagram schematically illustrating a third example interworking option between SONAC and MANO.

FIG. 10 is a block diagram schematically illustrating a third example interworking option between SONAC and MANO in accordance with representative embodiments of the present invention. In the interworking option of FIG. 10, the MANO is omitted. This option may be implemented in a Parent Domain NM 308 for interacting with a Child domain NM 306.

Figure 11:
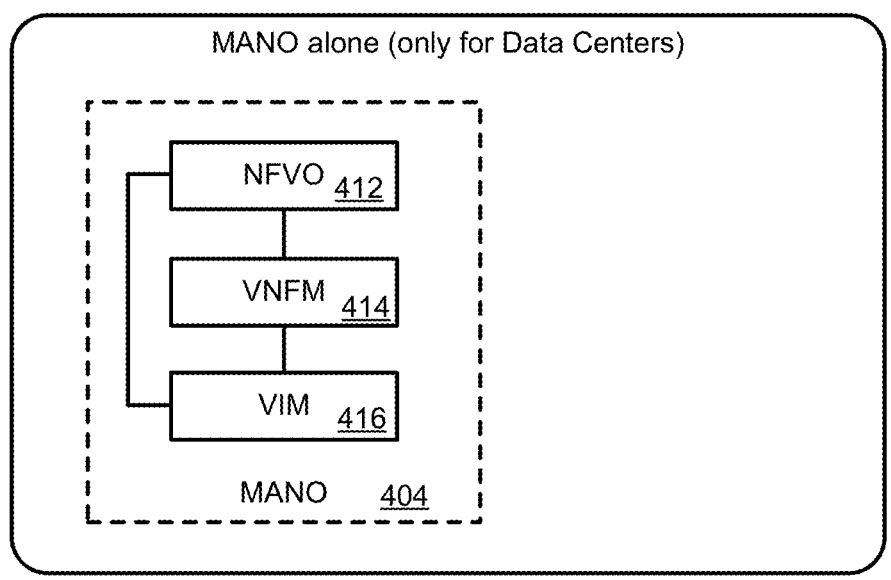
FIG. 11 is a block diagram schematically illustrating a fourth example interworking option between SONAC and MANO.

FIG. 11 is a block diagram schematically illustrating a third example interworking option between SONAC and MANO in accordance with representative embodiments of the present invention. In the interworking option of FIG. 11, the SONAC is omitted. This option may be implemented in a Child Domain NM 306 for interacting with a Parent Domain NM 308.

FIG. 12 is a chart illustrating example scenarios for managing a slice. It is contemplated that in all scenarios, the NM is responsible for initial design of a slice (i.e. selection of the slice properties), and this design may be passed to the SOM for implementation. In scenario "A", the NM is responsible for the instantiation, configuration, reconfiguration, usage and lifecycle management of a slice. In scenario "B", the NM is responsible for the instantiation, configuration, reconfiguration and usage of a slice, but the SOM is responsible for lifecycle management. In scenario "C", the NM is responsible for the instantiation, configuration and reconfiguration of a slice, but the SOM is responsible for usage and lifecycle management. In scenario "D", the NM is responsible for the instantiation and configuration of a slice, but the SOM is responsible for reconfiguration, usage and lifecycle management. In scenario "E", the NM is responsible for the instantiation of a slice, but the SOM is responsible for configuration, reconfiguration, usage and lifecycle management. In scenario "F", the SOM is responsible for instantiation, configuration, reconfiguration, usage and lifecycle management of a slice.

Figure 13A:
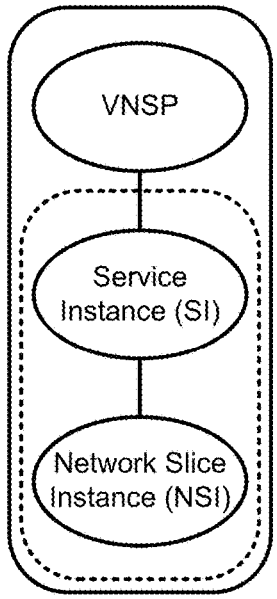
FIGS. 13A-13F illustrate respective different example use cases.
Figure 13B:
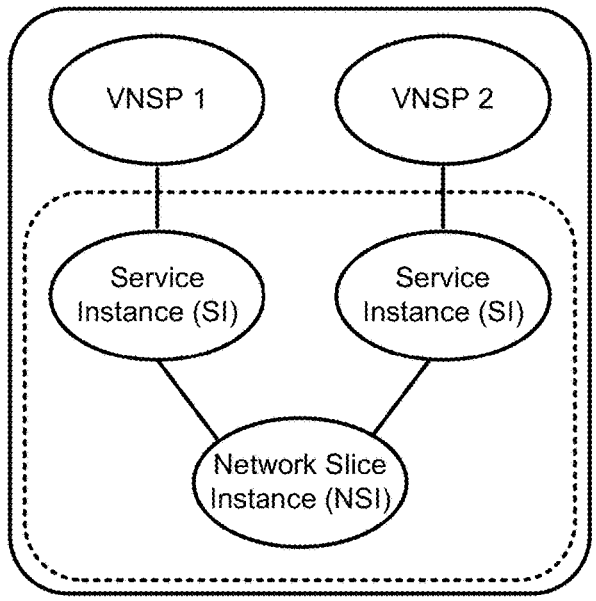
Figure 13C:
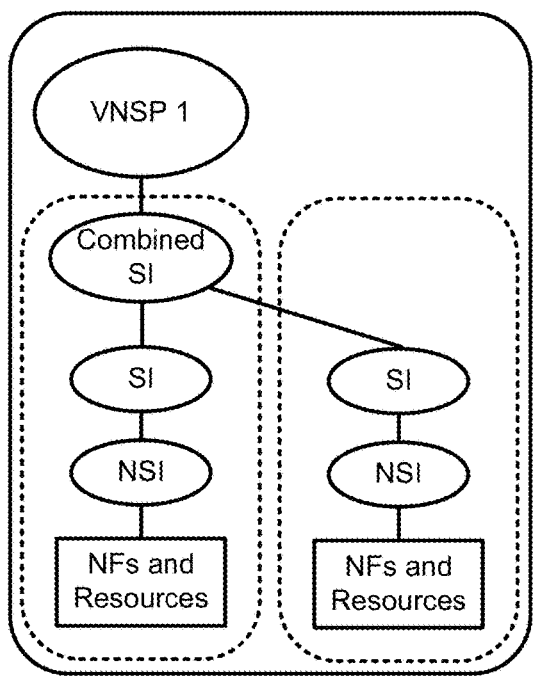
Figure 13D:
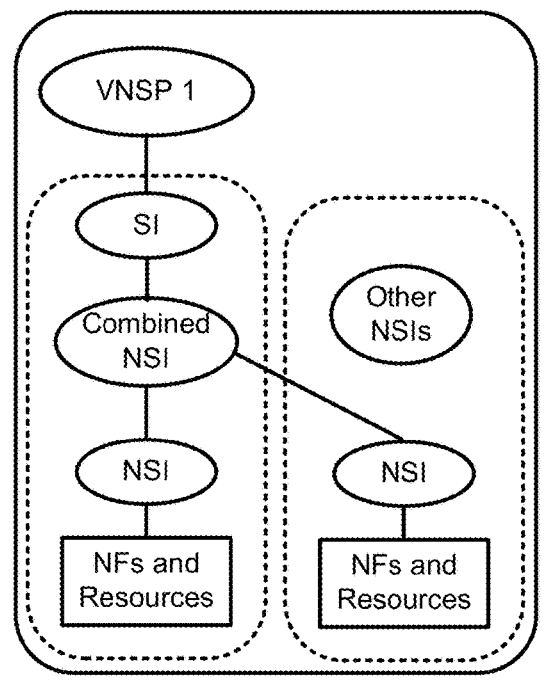
Figure 13E:
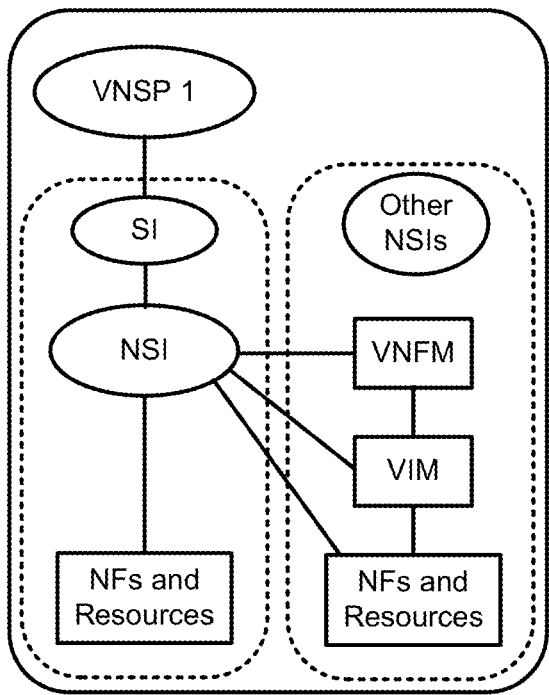
Figure 13F:
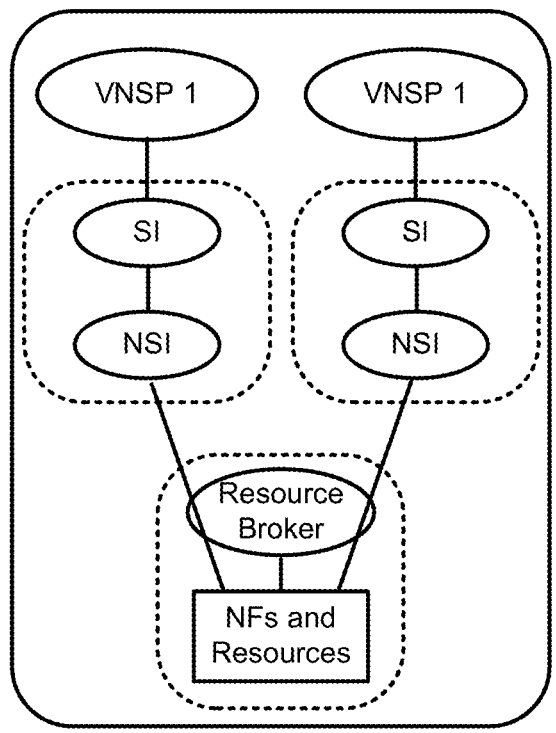

FIGS. 13A-13F illustrate respective different example use cases. In particular, FIG. 13A illustrates a use case in which one network slice provides only one VN service instance. FIG. 13B illustrates a use case in which Multiple service instances use the same network slice. FIG. 13C illustrates a use case in which a service instance uses a slice instance from another operator. For example, single user roaming can be considered as offering a temporary service instance (SI) using an existing network slice. FIG. 13D illustrates a use case in which a network slice from another operator is used to support a service instance. FIG. 13E illustrates a use case in which a set of resources from another operator are used to support a network slice instance. Finally, FIG. 13F illustrates a use case in which two different network operators share 3rd party resources.

FIGS. 14A-D illustrate the interaction of nodes illustrated in FIG. 5. Differences in the embodiments shown in these figures can be understood to be a function of which functions within the domains interact with each other. In some embodiments, the NM in the operator network can interact with the NM in the sub-domain, while in other embodiments the NM associates the resources of a sub-domain with a particular slice and relies upon the SOM to interact with the sub-domain. Different views of the network abstraction are reflected in the following call flow diagrams.

Figure 14A:
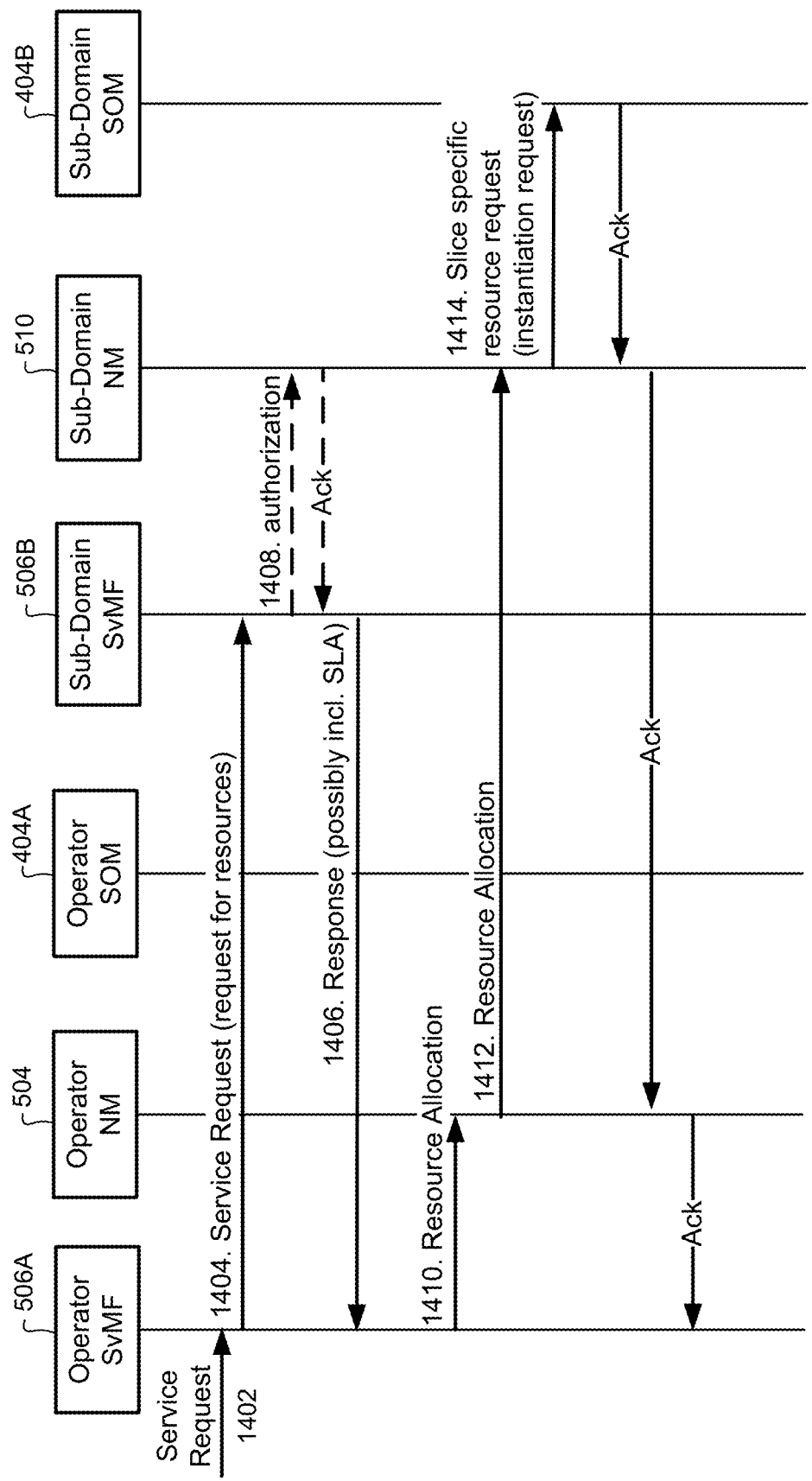
FIGS. 14A-14D are call flow diagrams illustrating the interaction of nodes illustrated in FIG. 5.

As shown in FIG. 14A, A service request 1402 may be received by an SvMF 506 within the operator domain from a customer. This service request may have an associated SLA defining a level of service to be provided. If the operator is to obtain resources managed by DNM1, the Operator SvMF 506B can transmit a service request 1404 to the SvMF 506B of the sub-domain (e.g. the network domain of DNM1). This request may be treated by the sub-domain SvMF 506B in the same fashion as the initial service request received by the operator SvMF 506A. Upon agreeing to terms of service (which may include defining an SLA), a response 1406 is transmitted to the Operator SvMF 506A. Those skilled in the art will appreciate that this exchange may happen in advance of the receipt of the service request from the customer in some embodiments. Where the customer initiated service request is received in advance of this exchange, the service request 1404 sent to the Sub-Domain SvMF 506B may be a request for resources that is determined in accordance with the initially received service request and a known resource availability in the operator domain. As illustrated, upon receipt of the service request from the operator SvMF 506A, the sub-domain SvMF 506B may provide an authorization 1408 message to the sub-domain NM 510 to instruct the sub-domain NM 510 that it can respond to requests from nodes and functions within the operator domain.

A resource allocation request 1410 is sent from the operator SvMF 504 to the operator NM 504. This may also include an indication of the availability of the resources in the sub-domain. Based on the received resource allocation request and the known available resources, the Operator NM 504 generates a resource allocation request 1412 that is transmitted to the sub-domain NM 510. Upon receipt of the resource allocation request from the operator NM 504, the sub-domain NM 510 sends a slice specific resource request 1414 to the sub-domain SOM 404B. This slice specific resource request can be understood as a request to instantiate functions or logical links within a slice. The SOM 404B may use this request as the basis of instructions sent to a MANO (not shown). Upon instantiation of the requested functions, or allocation of the requested resources, acknowledgements can be sent back towards the source (i.e. the operator SvMF 506A).

Figure 14B:
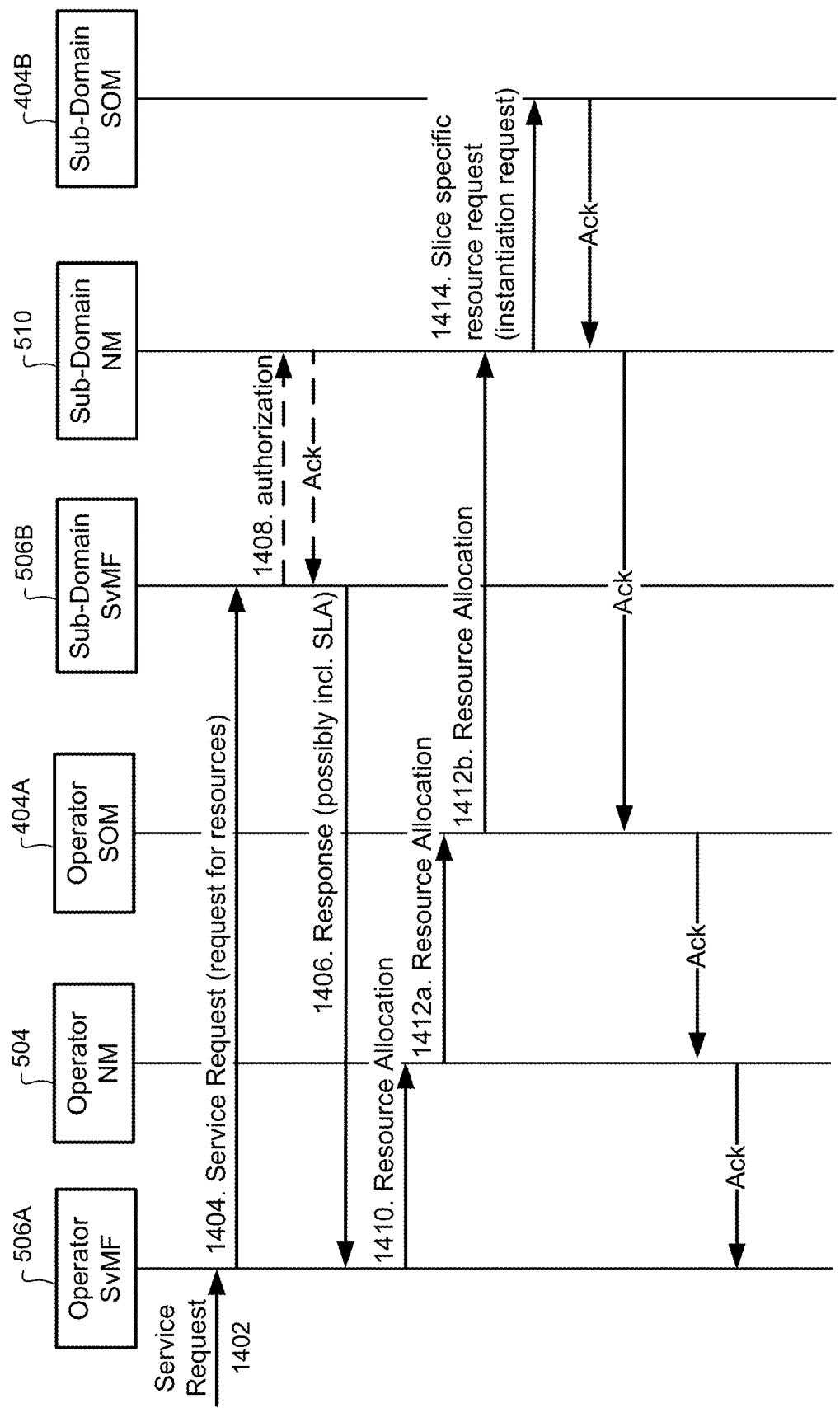

FIG. 14B is an alternate method to that illustrated in FIG. 14A. The differences from FIG. 14A begin with a resource allocation request 1410 being is sent from the operator SvMF 506A to the operator NM 504. This again may also include an indication of the availability of the resources in the sub-domain. Based on the received resource allocation request and the known available resources, the Operator NM 504 generates a resource allocation request 1412a that is transmitted to the operator SOM 404A. Upon receipt of this resource allocation request 1412a, the operator SOM 404A transmits a resource allocation request 1412b to the sub-domain NM 510. Upon receipt of the resource allocation request 1412b from the operator SOM 404A, the sub-domain NM 510 sends a slice specific resource request 1414 to the sub-domain SOM 404B. This slice specific resource request 1414 can be understood as a request to instantiate functions or logical links within a slice. The sub-domain SOM 404B may use this request as the basis of instructions sent to a MANO (not shown). Upon instantiation of the requested functions, or allocation of the requested resources, acknowledgements can be sent back towards the source (i.e. the Operator SvMF 06A).

Figure 14C:
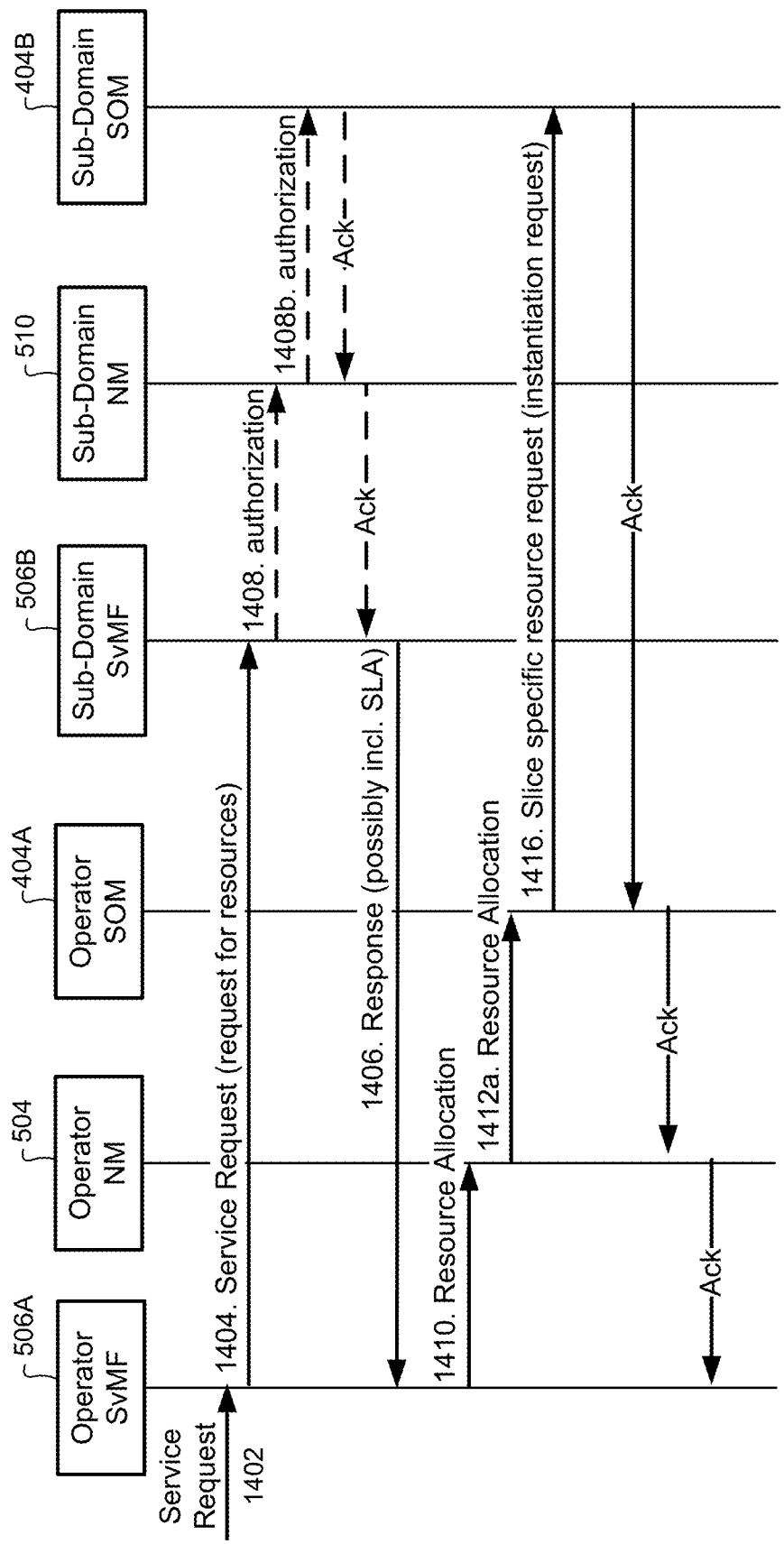

FIG. 14C shows a further alternate method to those illustrated in FIGS. 14A and 14B. In the embodiment of FIG. 14C, the Operator SOM 404A communicates directly with the sub-domain SOM 404B. As a result, during the initial phase in which resources in the sub-domain are reserved, the sub-domain SOM 404B is provided with an authorization message 1408b. Resource allocation messages 1410a-1410b from the Operator SvMF 506A to the Operator NM 504, and then to the Operator SOM 404 are sent as discussed above.

In response to receipt of the resource allocation request 1410b, the operator SOM 404 sends a slice specific resource request 1416 to the sub-domain SOM 404b. This slice specific resource request can be understood as a request to instantiate functions or logical links within a slice. The sub-domain SOM 404B may use this request as the basis of instructions sent to a MANO (not shown). Upon instantiation of the requested functions, or allocation of the requested resources, acknowledgements can be sent back towards the source (i.e. the Operator SvMF 506A). In an unillustrated embodiment, the Operator NM 506A may, upon receipt of the resource allocation request 1410, send the slice specific resource request 1416 directly to the sub-domain SOM 404B.

Figure 14D:
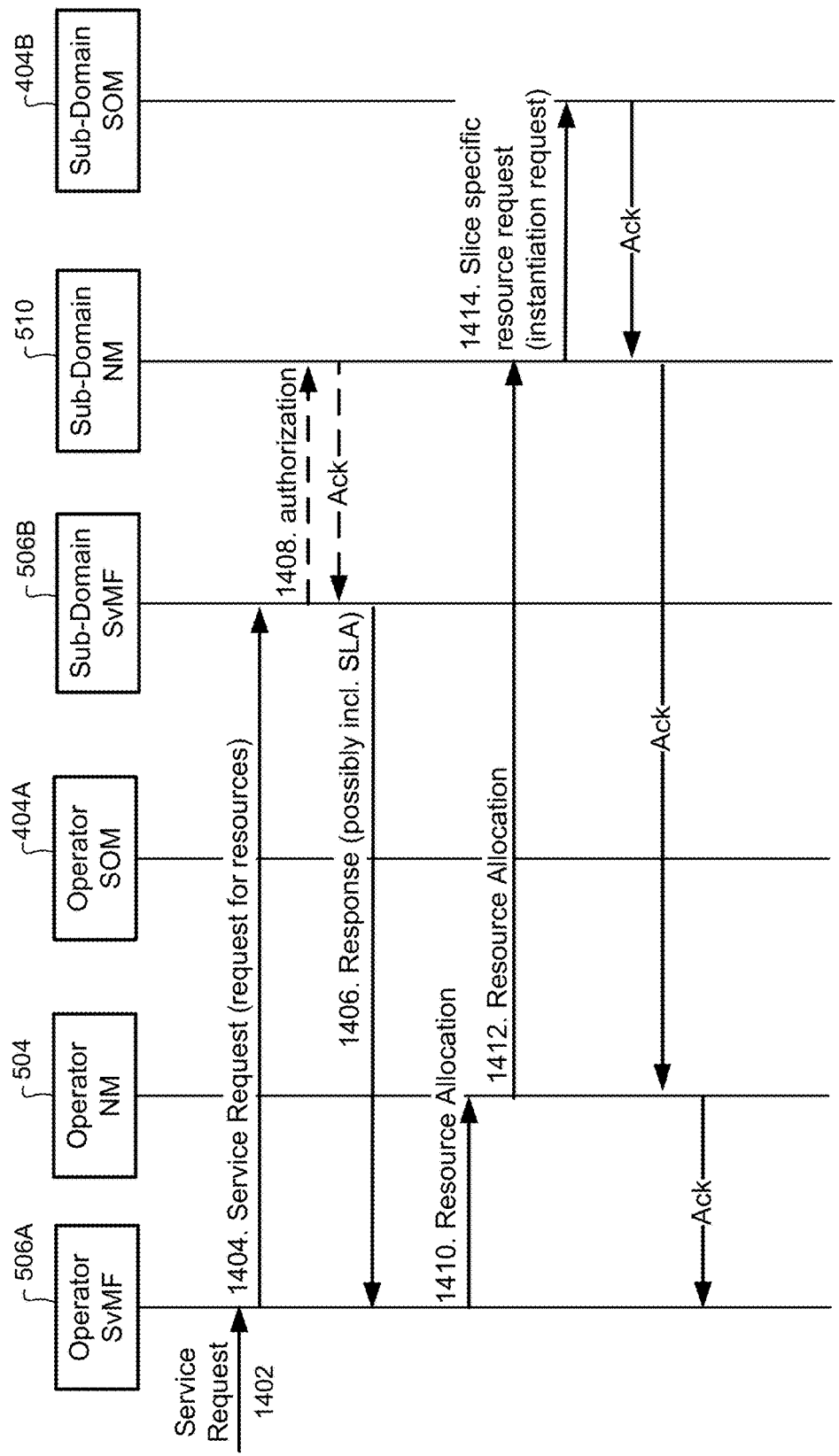

FIG. 14D is a further alternate method to those discussed above. In this embodiment, the operator NM 504 communicates directly with the sub-domain NM 510. After receiving a resource allocation request 1410 from the operator SvMF 506A, the operator NM 504 sends a resource allocation request 1412 directly to the sub-domain NM 510. The sub-domain NM 510 sends a slice specific resource request 1414 to the sub-domain SOM 404B. This slice specific resource request can be understood as a request to instantiate functions or logical links within a slice. The sub-domain SOM 404B may use this request as the basis of instructions sent to a MANO (not shown). Upon instantiation of the requested functions, or allocation of the requested resources, acknowledgements can be sent back towards the source (i.e. the Operator SvMF 506A).

As illustrated in FIG. 5, the operator network may have both a 3GPP compliant NM 512 (including an SvMF 514, an NM 516 and at least one SOM 518), and non-3GPP compliant SvMF 506, NM 504 and SOM 404. The non-3GPP compliant SvMF 506 may allow an operator to support a different set of instructions, and offer an enhanced set of services. In some embodiments, the set of service and functions provided by the non-3GPP SvMF 506 may be a superset of those provided by the 3GPP SvMF 514. To do this, the non-3GPP SvMF 506 may use the 3GPP compliant resources to provide the 3GPP supported functions and services, while using non-3GPP compliant resources to provide other service and functions. The 3GPP compliant SvMF 514 may carry out the messaging discussed above with respect to FIGS. 14A-D, but in doing so it would be communicating with 3GPP complaint SvMFs 514, NMs 516 and SOMs 518 in sub networks. A non-3GPP compliant SvMF 506 can communicate with either a 3GPP compliant or non-3GPP complaint set of network functions. It should be understood that to interact with a 3GPP compliant set of network functions in a sub-domain, the non-3GPP complaint SvMF 506 may either communicate directly with them, or it may use the 3GPP compliant SvMF 514 within the operator domain.

Figure 15:
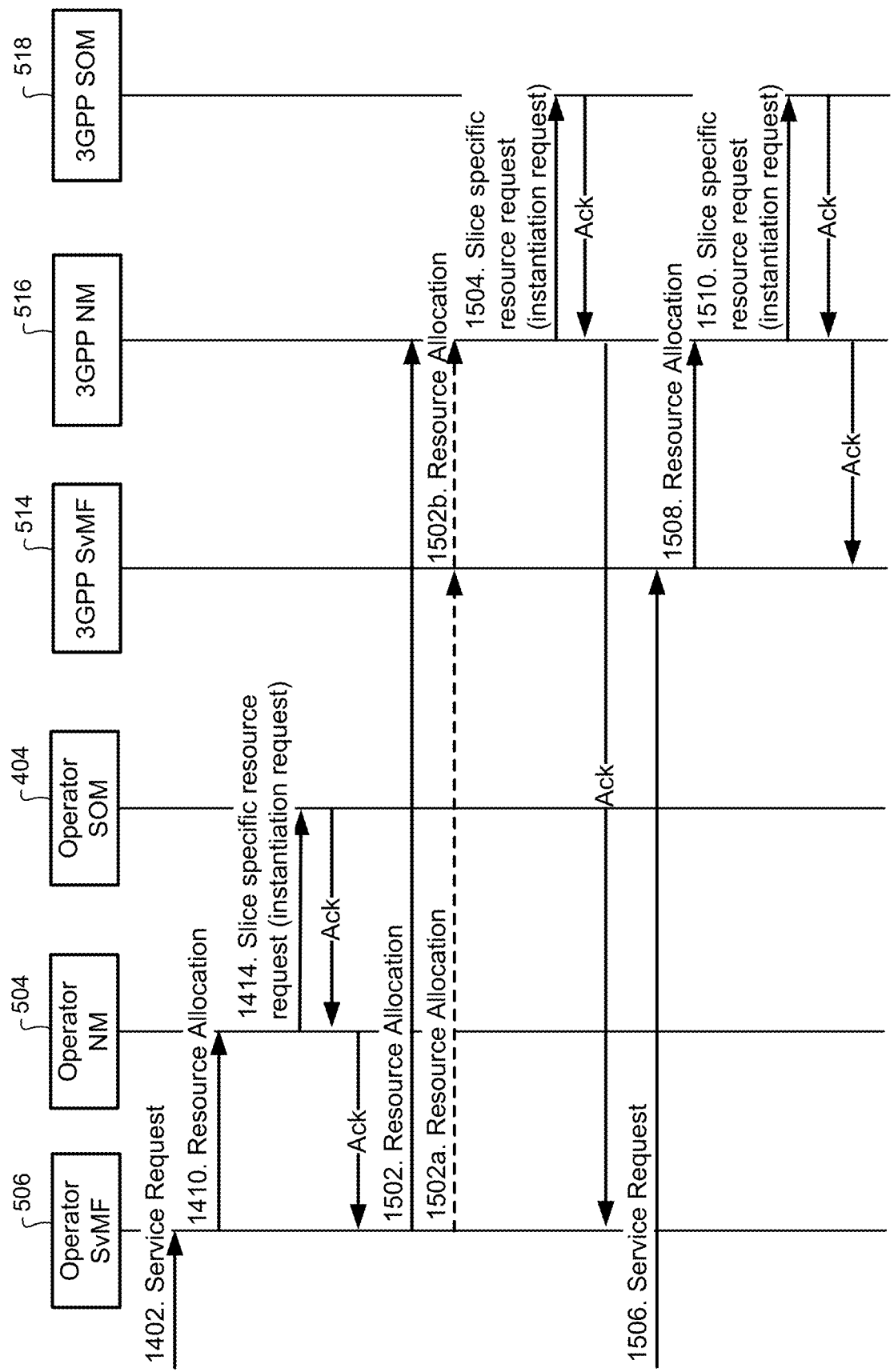
FIG. 15 is a call flow diagram illustrating an embodiment of the present invention.

FIG. 15 is a call flow illustrating an embodiment of the present invention. The operator SvMF 506 receives a service request 1402 from a customer. The SvMF 506 can determine from the request that some of the requested functions and services may be 3GPP compliant, while others are not. The operator SvMF 506 issues a resource allocation request 1410 to the Operator NM 504. This request will include a request for at least the resources required to provide the non-3GPP compliant services and functions. As illustrated in this figure, the Operator NM 504 can then send a slice specific resource request 1414 to the Operator SOM 404. Acknowledgements can be sent back towards the source (i.e. Operator SvMF 506). A second resource allocation request 1502, can be sent to the 3GPP NM 516 for 3GPP supported services and functions. In some embodiments, a first resource allocation request 1502*a* may be sent to the 3GPP SvMF 514 which can then send a corresponding resource allocation request 1502*b* to the 3GPP NM 516 as shown in dashed lines. The 3GPP NM 516 can then issue a slice specification resource request 1504 for 3GPP compliant resources to the 3GPP SOM 518. This slice specific resource request 1504 can be understood as a request to instantiate functions or logical links within a slice. The sub-domain SOM 518 may use this request as the basis of instructions sent to a MANO (not shown). Upon instantiation of the requested functions, or allocation of the requested resources, acknowledgements can be sent back towards the source (i.e. the Operator SvMF 506).

A service request 1506 for purely 3GPP compliant service can be sent. If it is sent to the Operator SvMF 506, the operator SvMF 506 may act as discussed above, or it may simply act as a proxy and forward the request to the 3GPP SvMF 514. In the illustrated embodiment, the request 1506 is transmitted directly to the 3GPP SvMF 514. The 3GPP SvMF 514 then sends a resource allocation request 1508 to the 3GPP NM 516, which in turn can then issue a slice specification resource request 1510 for 3GPP compliant resources to the 3GPP SOM 518. This slice specific resource request 1510 can be understood as a request to instantiate functions or logical links within a slice. The sub-domain SOM 518 may use this request as the basis of instructions sent to a MANO (not shown). Upon instantiation of the requested functions, or allocation of the requested resources, acknowledgements can be sent back towards the source (i.e. the 3GPP compliant SvMF 514).

Those skilled in the art will appreciate that the manner in which the operator SvMF obtains resources in sub-domains, as illustrated in and discussed with reference to FIGS. 14A-D, can be similarly performed by a 3GPP compliant SvMF. Similarly, although FIG. 15 illustrates the use of resources within the operator and 3GPP compliant networks (both of which are part of the operator network), one or both of the 3GPP compliant SvMF and the non-3GPP compliant SvMF, can request resources from other sub-domains as illustrated with reference to the call flows of FIGS. 14A-D. Thus, the method illustrated in FIG. 15 can be supplemented by the method described in reference to FIGS. 14A-D.

Those skilled in the art will appreciate that a network operator may choose to make one or both of the non-3GPP compliant and the 3GPP compliant SvMF visible to customers.

Figure 16:
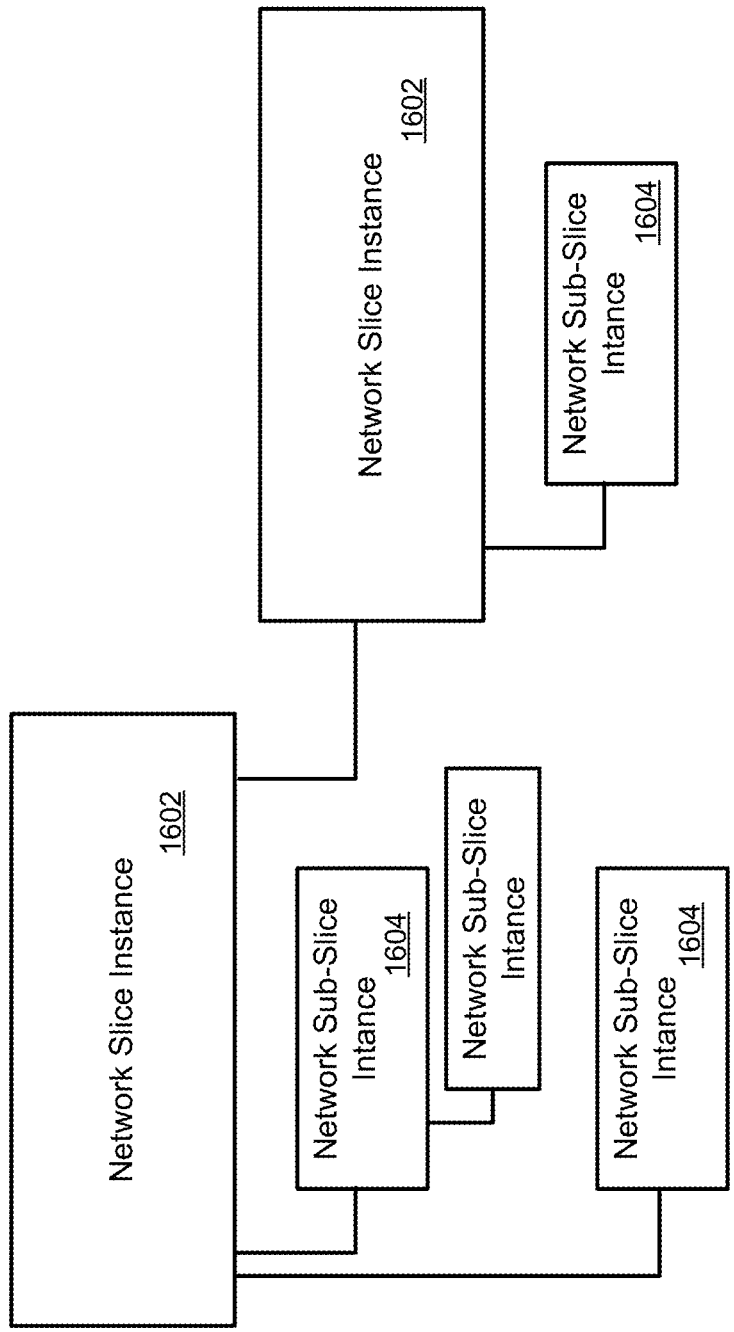
FIG. 16 is a block diagram illustrating an example model for the management of resources.

FIG. 16 illustrates a new model for the management of resources. A 3GPP compliant network slice instance (NSI) 1602 is considered to have associated resources, and may incorporate a network subnet slice instance (NSSI) 1604 with it. An NSSI 1604 may be a core network slice, or it may be a RAN slice. Through aggregating the resources of the various NSSIs 1604 within an NSI 1602, it is possible to create an end-to-end network. Services requested from sub-domains may be provided as an NS SI 1604.

By extending the 3GPP compliant model, an NSI 1602 can incorporate another NSI 1602 (which may be composed of at least one NSI 1602). This may result in redundant resources, for example more than one core network slice. This can be accommodated using, for example, a geographic or device type profile. This would allow a first core network slice having associated RAN slices to serve a first geographic area, while a second core network slice having a different set of RAN slices to serve a second geographic area.

In embodiments where RANs are shared between different core network slices, the selection of a core network slice may be a function of the service to which an electronic device such as a UE is subscribed, or it may be a function of the type of UE connecting (e.g. machine type communication devices may be assigned to the second core slice).

Based on the foregoing description, it may be understood that the present invention may provide any one or more of the following:

A method of controlling a service instance in a virtual network, the method comprising providing a Service Management Function entity in a control plane of the virtual network, the Service Management Function being configured to process requirements of a Service Level Agreement and generate corresponding control plane requests for physical resources to satisfy the Service Level Agreement.

In some embodiments the control plane requests are defined using an Application Program Interface of a Network Management function of the virtual network.

A method, for execution at a Service Management Function (SvMF) in an operator network, the method comprising: receiving a service request; determining a division of resources between an operator network and a subnetwork in accordance with the received service request and a known resource availability in the operator network; and transmitting a request for an allocation of instantiated resources in the operator network and the sub network in accordance with the determined division of resources.

In some embodiments the operator network and the subnetwork are 3GPP compliant networks.

In some embodiments at least one of the operator network and the subnetwork are non-3GPP compliant networks.

In some embodiments the step of transmitting includes transmitting a resource allocation request to a network manager within the operator network.

In some embodiments the step of transmitting includes transmitting a resource allocation request to an entity within the subnetwork.

In some embodiments the entity within the subnetwork is one of a SvMF, a Network Manager (NM) and a Slice Operations Manager (SOM).

In some embodiments at least one of the SvMF, the NM and the SOM is a non-3GPP compliant entity.

In some embodiments the step of determining includes determining a division of resources between 3GPP compliant resources and non-3GPP compliant resources.

In some embodiments the step of transmitting includes transmitting a resource allocation request to a management entity managing one or more service instances.

In some embodiments the step of transmitting includes transmitting a resource allocation request to a management entity managing one or more network slice instances.

In some embodiments the step of transmitting includes transmitting a resource allocation request to a management entity managing one or more network slice subnet instances.

In some embodiments the step of transmitting includes transmitting a resource allocation request for 3GPP compliant resources and services to a 3GPP compliant management entity.

In some embodiments the step of transmitting includes transmitting a resource allocation request for non- 3GPP compliant resources and services to a non-3GPP compliant management entity.

In some embodiments the step of transmitting includes transmitting a resource allocation request for 3GPP compliant resources and services to a non-3GPP compliant management entity.

In some embodiments the transmitted request includes a specification that the resources be provided as a network service instance (NSI), which may optionally include at least one network subnet slice instance (NSSI).

In some embodiments, upon receipt of a response to the transmitted request, incorporating into an existing NSI the received NSI as a sub-NSI.

A Service Management Function comprising a network interface, a processor and a memory for storing instructions that when executed by the processor configure the Service Management Function to carry out a method as recited in any one of the embodiments listed above.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for providing network resources in an operator network, the method comprising:
   receiving, by a service management function, a network slice service request;
   obtaining, by the service management function, local resource information from resource management entities of the operator network;
   transmitting, by the service management function to a second service management function, a second network slice service request for obtaining remote resource information from a subnetwork;
   receiving, by the service management function, from the second service management function, the remote resource information;
   determining, by the service management function, a division of resources between the operator network and the subnetwork in accordance with the received network slice service request, the obtained local resource information and the remote resource information; and
   transmitting, by the service management function, to an entity within the subnetwork, a request for an allocation of instantiated resources in the operator network and the subnetwork in accordance with the determined division of resources.

2. The method of claim 1, wherein the step of obtaining remote resource information comprises the second service management function requesting the remote resource information from a management entity of the subnetwork.

3. The method of claim 1 wherein the operator network and the subnetwork are 3GPP compliant networks.

4. The method of claim 1 wherein at least one of the operator network and the subnetwork are non-3GPP compliant networks, and the service management function acts as a proxy for the second service management function, the second network slice service request including resources not available in the operator network.

5. The method of claim 1, wherein the request for an allocation of instantiated resources is transmitted to a network manager within the operator network.

6. The method of claim 1, wherein the entity within the subnetwork is one of a service management function (SvMF), a network manager (NM) and a slice operations manager (SOM).

7. The method of claim 6, wherein at least one of the SvMF, the NM and the SOM is a non-3GPP compliant entity.

8. The method of claim 1, wherein the step of determining the division of resources includes determining a division of resources between 3GPP compliant resources and non-3GPP compliant resources.

9. The method of claim 8, wherein the request for an allocation of instantiated resources comprises a resource allocation request for 3GPP compliant resources and services, and is transmitted to a 3GPP compliant entity.

10. The method of claim 8, wherein the request for an allocation of instantiated resources comprises a resource allocation request for non-3GPP compliant resources and services, and is transmitted to a non-3GPP compliant entity.

11. The method of claim 8, wherein the request for an allocation of instantiated resources comprises a resource allocation request for 3GPP compliant resources and services, and is transmitted to a non-3GPP compliant entity.

12. The method of claim 1, wherein the request for an allocation of instantiated resources comprises a resource allocation request to a management entity managing one or more of:
   a service instance;
   a network slice instance; and
   a network slice subnet instance.

13. The method of claim 1, wherein the request for an allocation of instantiated resources includes one of a network service instance (NSI) and a network subnet slice instance (NSSI) to indicate the determined resources.

14. The method of claim 13 further comprising, upon receipt of a response to the request for an allocation of instantiated resources, incorporating into an existing NSI a received NSI as a sub-NSI.

15. A service management system comprising:
   a processor;
   a non-transitory computer readable storage medium including software instructions configured to control the processor to implement steps of:
      receiving a network slice service request;
      obtaining local resource information from resource management entities of an operator network;
      transmitting to a second service management function, a second network slice service request for obtaining remote resource information from a subnetwork;
      receiving from the second service management function, the remote resource information;
      determining a division of resources between the operator network and the subnetwork in accordance with the received network slice service request, the obtained local resource information and the remote resource information; and
      transmitting to an entity within the subnetwork, a request for an allocation of instantiated resources in the operator network and the subnetwork in accordance with the determined division of resources.

16. The service management system of claim 15 wherein the remote resource information is obtained by the second service management function requesting the remote resource information from a management entity of the subnetwork.

17. The service management system of claim 15 wherein the request for an allocation of instantiated resources is transmitted to a network manager within the operator network.

18. The service management system of claim 15 wherein the step of determining the division of resources includes determining a division of resources between 3GPP compliant resources and non-3GPP compliant resources.

19. The service management system of claim 15 wherein the request for an allocation of instantiated resources comprises a resource allocation request to a management entity managing one or more of:
   a service instance;
   a network slice instance; and
   a network slice subnet instance.

20. The service management system of claim 15, wherein the request for an allocation of instantiated resources includes one of a network service instance (NSI) and a network subnet slice instance (NSSI) to indicate the determined resource, and upon receipt of a response to the request for an allocation of instantiated resources, incorporating into an existing NSI a received NSI as a sub-NSI.

21. The service management system of claim 15 wherein at least one of the operator network and the subnetwork are non-3GPP compliant networks, and the service management function acts as a proxy for the second service management function, the second network slice service request including resources not available in the operator network;
   wherein the entity within the subnetwork is one of a service management function (SvMF), a network manager (NM), an element manager (EM) associated with a network element, and a slice operations manager (SOM), and at least one of the SvMF, the NM and the SOM is a non-3GPP compliant entity; and
   wherein the request for an allocation of instantiated resources comprises a resource allocation request for 3GPP compliant resources and services transmitted to a 3GPP compliant entity, a request for non-3GPP compliant resources and services transmitted to a non-3GPP compliant entity, or a request for 3GPP compliant resources and services, and is transmitted to a non-3GPP compliant entity.

\* \* \* \* \*